(12) United States Patent
Jiang

(10) Patent No.: US 11,007,433 B2
(45) Date of Patent: *May 18, 2021

(54) TASK ENABLED SWITCH SYSTEM

(71) Applicant: Jianfeng Jiang, Fremont, CA (US)

(72) Inventor: Jianfeng Jiang, Fremont, CA (US)

( * ) Notice: Subject to any disclaimer, the term of this patent is extended or adjusted under 35 U.S.C. 154(b) by 508 days.

This patent is subject to a terminal disclaimer.

(21) Appl. No.: 15/836,875

(22) Filed: Dec. 10, 2017

(65) Prior Publication Data

US 2019/0176036 A1 Jun. 13, 2019

Related U.S. Application Data

(63) Continuation-in-part of application No. 14/886,199, filed on Oct. 19, 2015, now Pat. No. 9,922,479.

(30) Foreign Application Priority Data

Apr. 19, 2017 (CN) .......................... 201710255772.3

(51) Int. Cl.
*A63F 13/35* (2014.01)
*E05B 47/06* (2006.01)
*E05B 67/22* (2006.01)
*A63F 13/46* (2014.01)
*A63F 13/69* (2014.01)
(Continued)

(52) U.S. Cl.
CPC .............. *A63F 13/35* (2014.09); *A63F 13/28* (2014.09); *A63F 13/46* (2014.09); *A63F 13/69* (2014.09); *A63F 13/70* (2014.09); *E05B 47/06* (2013.01); *E05B 47/0603* (2013.01); *E05B 65/50* (2013.01); *E05B 65/52* (2013.01); *E05B 67/22* (2013.01); *G06K 7/10366* (2013.01); *G06K 7/10722* (2013.01); *G06K 7/1417* (2013.01); *G07C 9/00309* (2013.01); *G07C 9/00571* (2013.01); *G07C 9/00912* (2013.01); *H04L 63/10* (2013.01); *H04L 63/102* (2013.01); *E05B 47/0002* (2013.01); *E05B 47/0012* (2013.01); *E05B 47/023* (2013.01); *E05B 2047/0095* (2013.01); *G07C 2009/00507* (2013.01)

(58) Field of Classification Search
CPC .. G09B 19/00; G09B 7/00; G09B 7/02; E05B 47/00; E05B 47/0002; E05B 47/06; E05B 65/52; E05B 67/22; E05B 47/0603; A63F 13/28; A63F 13/70
See application file for complete search history.

(56) References Cited

U.S. PATENT DOCUMENTS 8,794,974 B2 * 8/2014 Hollaar ................. G09B 19/00
434/236
2008/0270240 A1 * 10/2008 Chu .................... G06Q 30/0239
705/14.11

* cited by examiner

*Primary Examiner* — Jerry-Daryl Fletcher

(57) ABSTRACT

A Task Enabled Switch System comprising: A Data Server with a Task Manager Module, Skill Management Module and a Switch Device Management Module; A Client Device with a Task Player; A Switch Device with a Task Enabled Switch; A user uses the Client Device to download the tasks linked with the Switch Device. Once the tasks are completed successfully, the Client Device will turn on the Task Enabled Switch in the Switch Device. The user can also accumulate reward points, or reward badges, or reward pictures for tasks done, and redeem the points to open the Switch Device. Several lock/latch designs with the said Task Enabled Switch are also presented. A game system comprises of the game pieces with 2D Barcodes, Skill Management Module and Task Enabled Switch is also revealed.

37 Claims, 21 Drawing Sheets

(51) Int. Cl.
  *G06K 7/14* (2006.01)
  *G06K 7/10* (2006.01)
  *A63F 13/70* (2014.01)
  *G07C 9/00* (2020.01)
  *H04L 29/06* (2006.01)
  *A63F 13/28* (2014.01)
  *E05B 65/52* (2006.01)
  *E05B 65/50* (2006.01)
  *E05B 47/00* (2006.01)
  *E05B 47/02* (2006.01)

A stand alone pad lock with said Task Enabled Switch and a keypad

Diagram of a pad lock with the said Task Enabled Switch

Diagram of a lock used in a box with the said Task Enabled Switch

Diagram of a latch used in a box with the said Task Enabled Switch

Task Enabled Switch flow chart

Task Enabled Switch controlled toy, can control the lighting, sound, movement or other functions of the toy by the outcomes of the tasks linked with the toy.

Diagram of another pad lock with the said Task Enabled Switch sample design of a briefcase lock with Task Enabled Switch Diagram of another pad lock with the said Task Enabled Switch

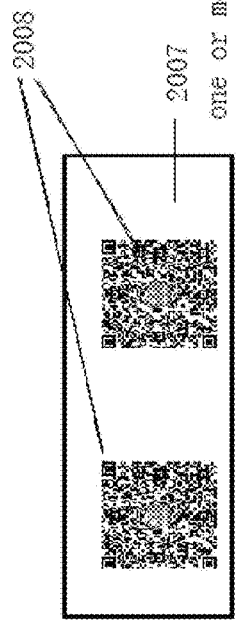

2008
2007 — one or more game pieces with 2D Barcodes

The game system based on the said invention comprises the following steps:

2001. A user joins the game system;

2002. The Skill Management Module 1701 assigns the skills and skill level for each player;

2003. Each player scans the 2D barcode on selected game pieces using the client device 104, the client device 104 uploads the user identifiers and the 2D barcode identifier to the Data Server 101;

2004. The client device 104 receives one or more tasks from the Skill Management Module 1701, the one or more tasks are based on the user identifier, 2D barcode identifier, and the skill level.

2005. Once a player finishes the one or more tasks, the client device 104 will upload the results to the one or more Data Server devices 101, and the Data Server 101 will decide how many points or what rewards badges or reward pictures the player should receive based on the results of the completion of the tasks.

2006. Once the points earned by a player or the total points earned by a team of players reached the designated value, or the reward badges or reward pictures collected by one player or a team of players reached the designated set, the game ends.

a game system based on the said invention   Fig. 20

TASK ENABLED SWITCH SYSTEM

This invention is continuation in part for the patent application Ser. No. 14/886,199 filed in the U.S. on Oct. 19, 2015, and also claim foreign priority of patent application 201710255772.3 filed in China on Apr. 19, 2017.

FIELD OF INVENTION

This invention relates to parenting, electronic locks, 2 Dimensional QR Codes, E-learning, toys, gift boxes, vending machines, jewelry boxes, safe boxes, game stations, amusement parks and advertisements.

BACKGROUND OF THE INVENTION

We have lots of different boxes for different purposes, such as gift boxes, jewelry boxes, safe boxes etc. some of the boxes have either electronic or mechanic locks. Some locks are to be opened with physical keys, other locks are to be opened by selecting or entering the correct code for the lock. On the other hand, people, especially kids, get rewarded for doing something good. It would be desirable if the user can be authorized to open a reward box or a gift box after he/she did some assigned tasks correctly. The tasks can be finishing a computer game, or doing a quiz, reading a book, or doing a chore, or some other physical tasks. That is, once a user finished the tasks, the box will be opened automatically, or the user will be given a code to open the box.

Furthermore, a user (such as a child) can receive reward points for tasks done or for good behavior, once the reward points reached a preset level, the user can redeem the points by getting access to open the box with real rewards inside.

Furthermore, the tasks to open the box can be downloaded from the backend Data server, or simply from other forms of electronic or non-electronic instructions given by a human person, such as parent or a teacher. E.g. The parent can just verbally ask the child to do a task, or ask the child to follow a good behavior. Once the parent found out that the task is done, or the child displayed a good behavior, she can give the child certain reward points.

The required points, or badges, or pictures needed to get access to open the switch can be set by the Data Server, or by a human judge (the parent, or the owner, or the operator of the switch).

Also, the tasks to open the box can come from Instant Messaging. Basically, there can be an Instant Messaging Module in the Data Server, the user who wants to open the box can do a conversation with a judge (or the owner of the box) through the Instant Messaging. If the judge is happy with the user's messaging response, the judge can grant the user the permission to open the box.

On the other hand, there are lots of vending machines, a user can insert coins or paper money or tokens, or swipe credit cards to get access to a vending machine. He/she can then punch the digit pads to select an item (across rows and columns). It would be desirable for the product promotions or advertisements to offer user incentives to do a quiz or game, or other tasks on their mobile devices. After the task is done, an item in the vending machine will be opened automatically. Or a pass code will be given to the user through his mobile device. The user can then enter the pass code on the vending machine, and select an item to open. Or, the pass code may only apply to one designated item, and only that designated item will be opened after entering the pass code.

Furthermore, there are lots of coin operated devices such as mini-carousel, or game stations, it would also be desirable to have the alternative task enabled switch feature. That is, a user can download the designated tasks using a mobile device and open the devices after the tasks are completed.

Finally, the user can use the said Task Enabled Switch to control the lighting, motion, voice, temperature, smell, size or other functions of the connected devices.

The essence of this invention is a Task Enabled Switch, which allows the switch on a Switch Device (such as a box, a lock, a vending machine, a toy etc) to be controlled by a server device or a mobile device after a user successfully finished the designated task or accumulated enough reward points, reward badges or reward pictures. Once the task is completed or reward points redeemed, the server device or the mobile device can turn on the switch automatically; or the user will be given a temporary pass code, the user can then enter the pass code on a computer, or on the mobile device or on the Switch Device to open the switch.

The methods to determine whether a task is done can be automatic, such as a computer learning game; or manually by a human judge, such as a parent or a teacher; or by scanning a particular QR code, a particular image, a particular optical or Radio Frequency Tag.

There can be two kinds of pass codes for the Switch Device: one kind is the Owner Code for the owner, the other kind is Temporary User Codes for general users. The Temporary User Codes are temporary, and will be in-validated once the code is being used to open the switch. And new Temporary User Codes will be generated to replace the used codes, so that the user need to do some new tasks if he/she wants to open the Switch Device again.

Finally, a game system is revealed that consists of a set of game pieces, each game piece has a dynamic QR code, or other optical or Radio Frequency tag. Each player can pick any game piece or game pieces, and scan the QR code or the Optical or RF tag, or simply take a picture of the game piece, the player will receive one or more tasks according to his/her current skill levels. Once the player finishes the tasks, he will receive reward points, reward badges or reward pictures for these tasks. The first player or a team of players who earned the pre-set reward points or the required set of reward badges or reward pictures will be the winner. Of course, a reward box with the Task Enabled Switch can be incorporated in the game system, so that the winner can get permission to open the box after winning and retrieve the real reward.

It should be pointed out that the proposed game pieces can be as small as ordinary chess pieces to be played at home, or as large as the roller coasters in an amusement park, or the exhibits in a zoo. And there can be some variations in the actual implementations. In the settings of an amusement park, we can set each roller coaster ride as a task. In this case, the user can skip the step of scanning a QR code to retrieve tasks. Rather, he can just pick a roller-coaster and take the ride. After the user finishes riding that rollercoaster, he can scan a QR code at the exit, which will automatically notify the Data Server that the user finished riding that rollercoaster. In the setting of a Zoo, each exhibit can have a poster with a QR code, when a user scans the QR code, it can either notify the Data Server that the user visited that exhibit, or it can retrieve some electronic learning games or quizzes related to the exhibit for the user to answer. The winning criteria can be set to be either the number of exhibits visited during a certain time period, or the number of quizzes completed during a certain time period.

The said invention can be combined with other board games or playing cards. After a player scans a 2D barcode, answers one or more quizzes, or finishes one or more tasks, the Data Server will assign instructions on what the player should do or should move next on the board game or with the playing cards.

SUMMARY OF THE INVENTION

In accordance with one aspect of the invention, a Task Enabled Switch System consists of: a Data Server that manages the tasks linked with a Switch Device; a Client Device that can download the tasks, play the tasks and control the Switch Device; a Switch Device that contains a Task Enabled Switch. The user can open the Switch Device after finishing the tasks using the Client Device.

In accordance with another aspect of the invention, there are skill libraries in the Data Server, each skill has different levels, and each level has different tasks.

In accordance with another aspect of the invention, there is a User Skill Management module in the Data Server that keeps track of all the skills & tasks done by a user, and decides the current skill levels of the user, and automatically assigns the tasks to open the box according to the user's current skill levels.

In accordance with another aspect of the invention, the Task Enabled Switch has Temporary User Codes that are in-validated after being used.

In accordance with another aspect of the invention, the Switch Device may have a 2 Dimensional QR code, a user can scan the QR code and download the designated tasks.

In accordance with another aspect of the invention, the Switch Device has a Radio Frequency tag (RF tag), a user can scan the RF tag and download the designated tasks.

In accordance with another aspect of the invention, the user can just scan the switch device, or any optical or RF tags on the switching device, then download the designated task.

In accordance with another aspect of the invention, the Tasks linked with the Switch Device can be computer games, quizzes, readings, or house chores, sports, singing, acting, performance, or other physical tasks.

In accordance with another aspect of the invention, the judgement of whether the user passed the task can be automatic or manual. If it's automatic, then the tasks are graded automatically by the Client Device or the Data Server right after they are completed. If it's manual, then a physical judge or a teacher needed to review the task and upload the grades.

In accordance with another aspect of the invention, a special QR code, or special optical tag or RF tag, or simply a special picture can be used so that when the judge or the user use the Client Device to scan the special QR code, or the special optical tag or RF tag, or the special picture, it will automatically notify the server that the user has completed and passed the task.

In accordance with another aspect of the invention, a user can receive reward points for tasks done or for good behavior. Once they accumulated enough reward points, they can redeem the points to get access to open the box with the real rewards inside.

In accordance with another aspect of the invention, the tasks assigned can be downloaded from the Data Server, or from other forms of electronic or non-electronic instructions given by a human person.

In accordance with another aspect of the invention, there is a User ID Recognition Module in the Client Device, the Task Manager in the Data Server can assign different tasks to different users even when all the users are trying to open the same Switch Device at the same time.

In accordance with another aspect of the invention, the completion history and results of each task are uploaded to the Skill Management Module, which is used to determine the skill levels of each user.

In accordance with another aspect of the invention, the Switch Device can have multiple chambers or selections. The pass code given to the user after completing the tasks can be a Long Code which can only open the designated selection, or a Short Code which the user can choose selections after entering the Short Code.

In accordance with another aspect of the invention, a stand alone pad lock can contain a Task Enabled Switch, a metal shackle with a dent, and a metal bar that can be pushed in or out of the dent by electromagnetic means.

In accordance with another aspect of the invention, a standalone pad lock can contain a Task Enabled Switch, a metal shackle with one or more dents, a rotating piece with one or more dents, wherein the rotating piece can push a small ball in or out of the dent of the shackle by electromagnetic means.

In accordance with another aspect of the invention, a briefcase lock can contain a Task Enabled Switch, a frame with a hole, a bolt with a wedge shaped tip that can be pushed in or out of the hole in the frame.

In accordance with another aspect of the invention, a briefcase lock can contain a Task Enabled Switch, a frame with a hole, a bolt with a wedge shaped tip that can be pushed in or out of the hole in the frame, and a spring that can automatically push the frame up when lock is opened.

In accordance with another aspect of the invention, a briefcase lock can contain a Task Enabled Switch, a frame with a hole, a bolt with a wedge shaped tip that can be pushed in or out of the hole in the frame, and a piece that can be pushed up automatically when the lock is opened to block the lock bolt from being pushed back into the frame hole, and the piece can be manually pushed down below the metal bolt before locking the lock.

In accordance with another aspect of the invention, a latch used in a Switch Box contains a Task Enabled Switch.

In accordance with another aspect of the invention, the Task Enabled Switch can be used to control the lighting, sound, temperature, smell, size, movement or other functions of the Switch Device.

In accordance with another aspect of the invention, a computer implemented game system comprising: Game pieces with 2D Barcodes, or optical tags, or RF tags; One or more server devices: where in the players join the game, select skill levels, and select one or more game pieces, and scan the 2D Barcodes using one or more client devices; The player then receive one or more tasks from the one or more server devices; wherein after the player completed the task, he or she will receive reward points, or reward badges, or reward pictures; and the first player or the first team of players who earned the pre-required points, badges, or pictures win the game;

In accordance with another aspect of the invention, the said invention can be combined with other board games or playing cards.

BRIEF DESCRIPTION OF THE DRAWINGS

FIG. 20 shows the game system with QR code game pieces.

DETAILED DESCRIPTION OF THE INVENTION

The present invention relates to a Task Enabled Switch System. The following description is presented to enable one of ordinary skill in the art to make and use the invention as provided in the context of a particular application and its requirements. Various modifications to the preferred embodiment will be apparent to those with skill in the art and the general principles defined herein may be applied to other embodiments. Therefore, the present invention is not intended to be limited to the particular embodiments shown and described, but is to be accorded the widest scope consistent with the principles and novel features herein disclosed.

Figure 1:
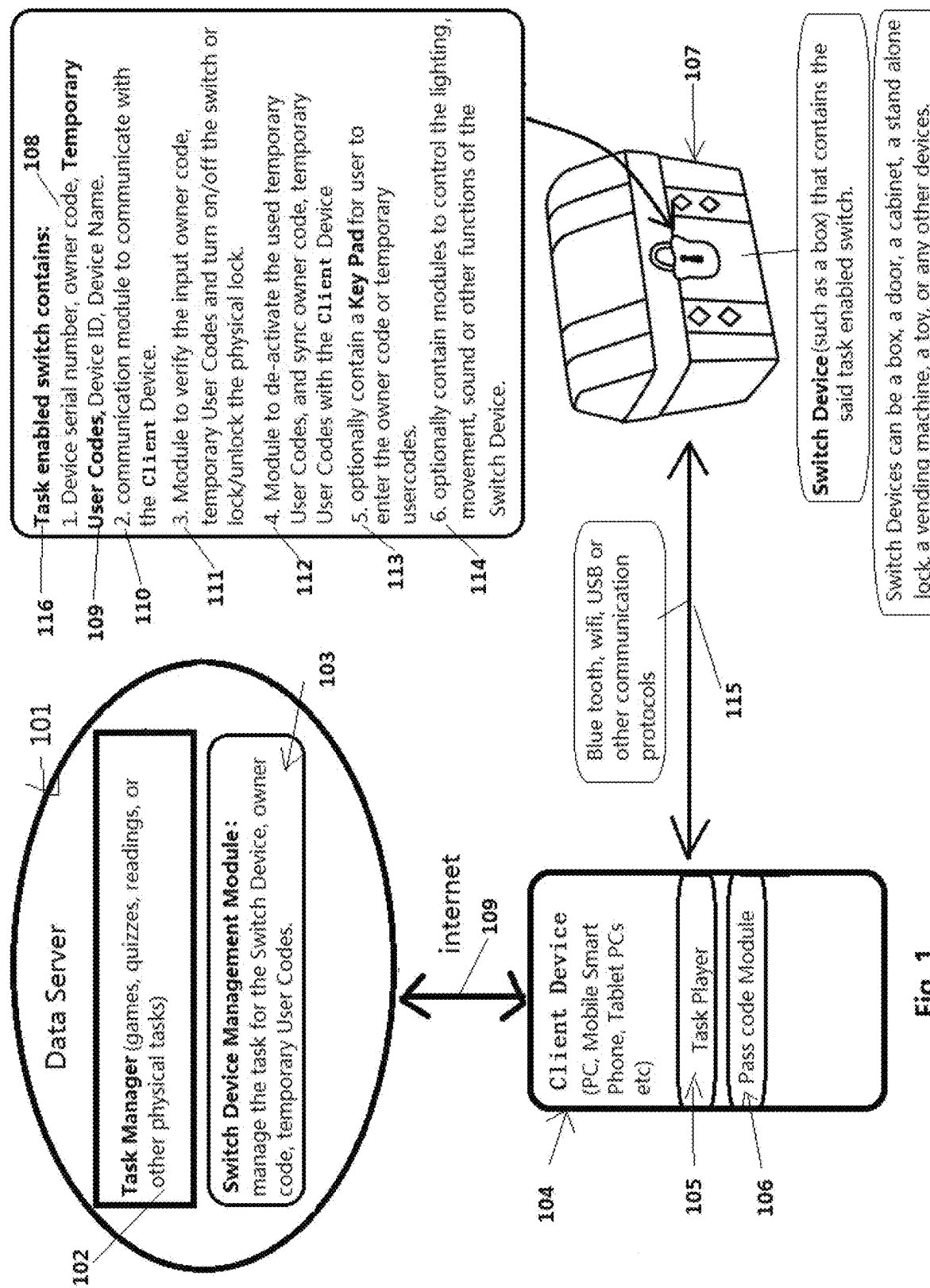
FIG. 1 is a schematic representation of the Task Enabled Switch System. It consists of: a Data Server that manages the tasks linked with a Switch Device; a Client Device that can download the tasks, play the tasks and control the Switch Device; a Switch Device that contains a Task Enabled Switch. The user can open the Switch Device after finishing the tasks using the Client Device.

As shown in FIG. 1, the said Task Enabled Switch System consists of a Data Server 101, a Client Device 104 and a Switch Device 107. There is a Task Manager 102 and Switch Device Management Module 103 in the Data Server 101. The Task Manager 102 manages all the tasks. The tasks can be computer games, quizzes, readings, or house chores, sports, or other physical tasks. The judgement of whether the user passed the task can be automatic or manual. If it's automatic, such as a computer game, then the tasks are graded automatically by the Client Device or the Data Server right after they are completed. If it's manual, like a chore or sports activity, then a physical judge or teacher need to review the task and upload the grades.

To make it easier to notify the server 101 that a manual task is done, we can make a special QR code, or special optical tag or RF tag, or simply a special picture so that when the judge or the user use the Client Device 104 to scan the special QR code, or the special optical tag or RF tag, or the special picture, it will automatically notify the server 101 that the user has completed and passed the task.

The Switch Device Management Module 103 manages the tasks for each Switch Device. It also manages the Owner Codes and Temporary User Codes for each Switch Device.

The Task Manager 102 and the Switch Device Management Module 103 can assign different tasks to different users, so that when multiple users try to open the same Client Device at the same time, each user can receive different personalized tasks.

The Client Device 104 can be a PC, a mobile Smart Phone, a Tablet PC etc, it has a Task Player 105 to play the downloaded tasks. It also has a Pass Code Module 106. The Client Device 104 communicates with the Switch Device 107 through Blue Tooth, Wifi, USB or other communication protocols 115.

The Switch Device 107 has a Task Enabled Switch 116, the Task Enabled Switch contains:
1. Device serial number, Owner Code 108, Temporary User Codes 109, Device ID, and Device Name.
2. Communication Module 110 to communicate with the Client Device 104.
3. Module 111 to verify the input Owner Code, Temporary User Codes, and turn on/off the switch or lock/unlock the physical lock.
4. Module 112 to de-activate or in-validate the used Temporary User Codes, and sync the Owner Code 108, Temporary User Codes 109 with the Client Device 104.
5. it may also contain a Key Pad for user to enter the Owner Code 108 or the Temporary User Codes 109.
6. It may also contain modules 114 to control the lighting, movement, sound or other functions of the Switch Device 107.

Figure 2:
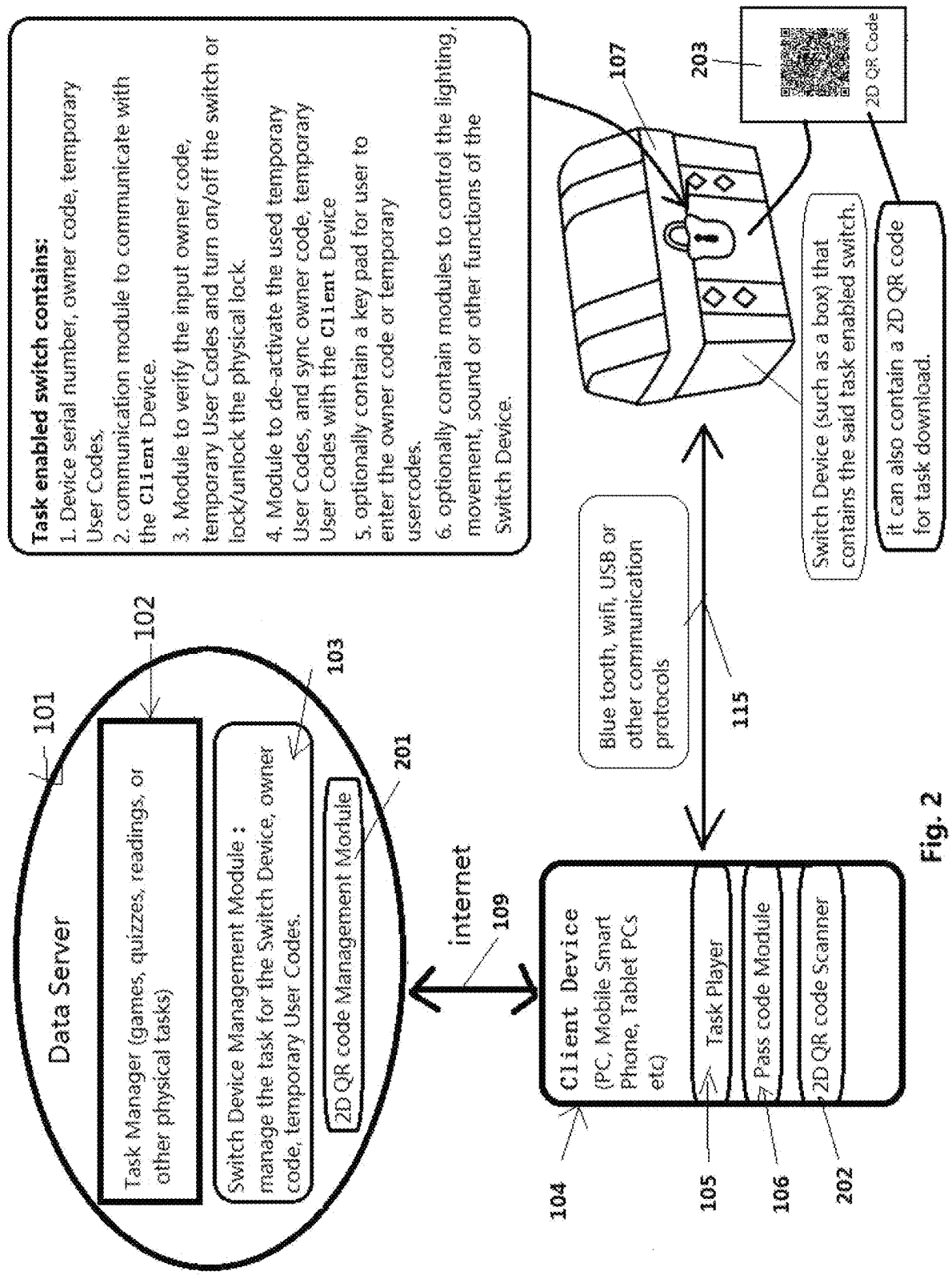
FIG. 2 is another schematic representation of the Task Enabled Switch System. It has 2D QR code Management Module in the Data server; 2D QR code Scanner in the Client Device, and a 2D QR code on the Switch Device.

As shown in FIG. 2. There can be a 2D QR code 203 on the Switch Device 107. The 2D QR code can be both static or dynamic. A static 2D QR code points to a fixed destination web address, while a dynamic 2D QR code can point to a different web address from time to time. A user can scan the 2D QR code 203 using the 2D QR code Scanner 202 to download the tasks. Also there is a 2D QR code management Module 201 in the Data Server 101 to manage all the 2D QR codes 203 and their destination web addresses.

It should be pointed out that we can use not only 2D QR codes 203 on the Switching Device 107, but also any machine readable optical or Radio Frequency tags, or just take a picture of the Switching Device 107 using the client device 104 should be fine. So long as the Data Server 101 has the program to identify the optical or Radio Frequency tags or images, and direct the request from the client device 104 to the destination web addresses.

Figure 10:
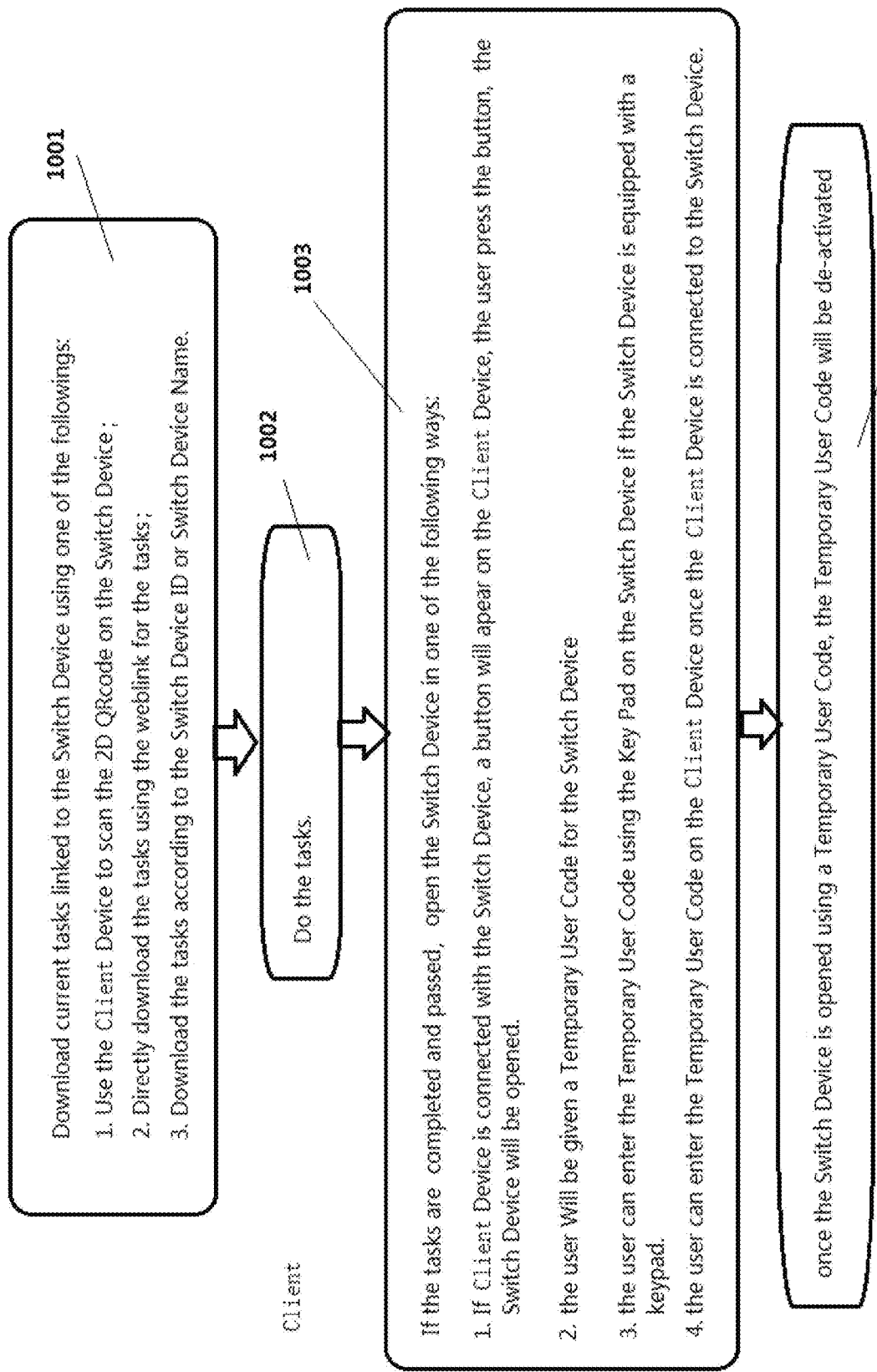
FIG. 10. is the flow chart for the Task Enabled Switch.

As shown in FIG. 10, the Task Enabled Switch System operates as follows:

Step 1001: Download current tasks linked to the Switch Device 107 using one of the followings:
1. Use the Client Device 104 to scan the 2D Qrcode 203 on Switch Device;
2. Directly download the tasks using the weblink for the content;
3. Download the tasks according to the Switch Device ID or Switch Device Name.

Step 1002: The user do the tasks.

Step 1003: If the tasks are completed and passed. The user can open the Switch Device 107 in one of the following ways:
1. If Client Device 104 is connected with the Switch Device 107, a button will appear on the Client Device 104, the user press the button, the Switch Device 107 will be opened.
2. The user will be given a Temporary User Code 109 for the Switch Device 107, through the Client Device 104, or through E-mail, or other means.
3. The user can enter the Temporary User Code 109 using the Key Pad on the Switch Device 107 if the Switch Device 107 is equipped with a keypad.
4. The user can enter the Temporary User Code 109 on the Client Device 104 once the Client Device 104 is connected to the Switch Device 107.

Figure 3:
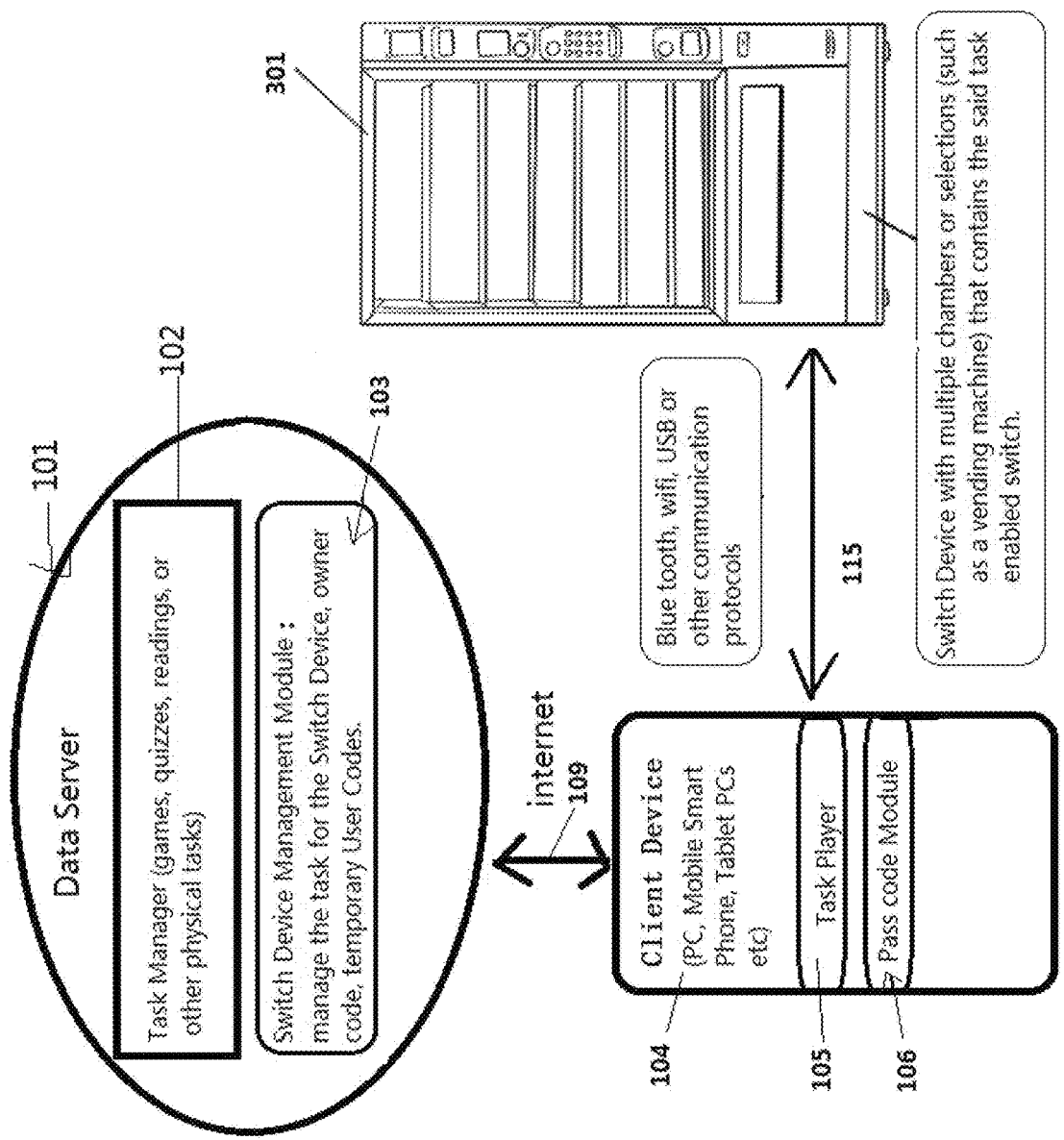
FIG. 3 is a schematic representation of the Task Enabled Switch System, in which the Switch Device has multiple chambers or selections, such as a vending machine.
Figure 4:
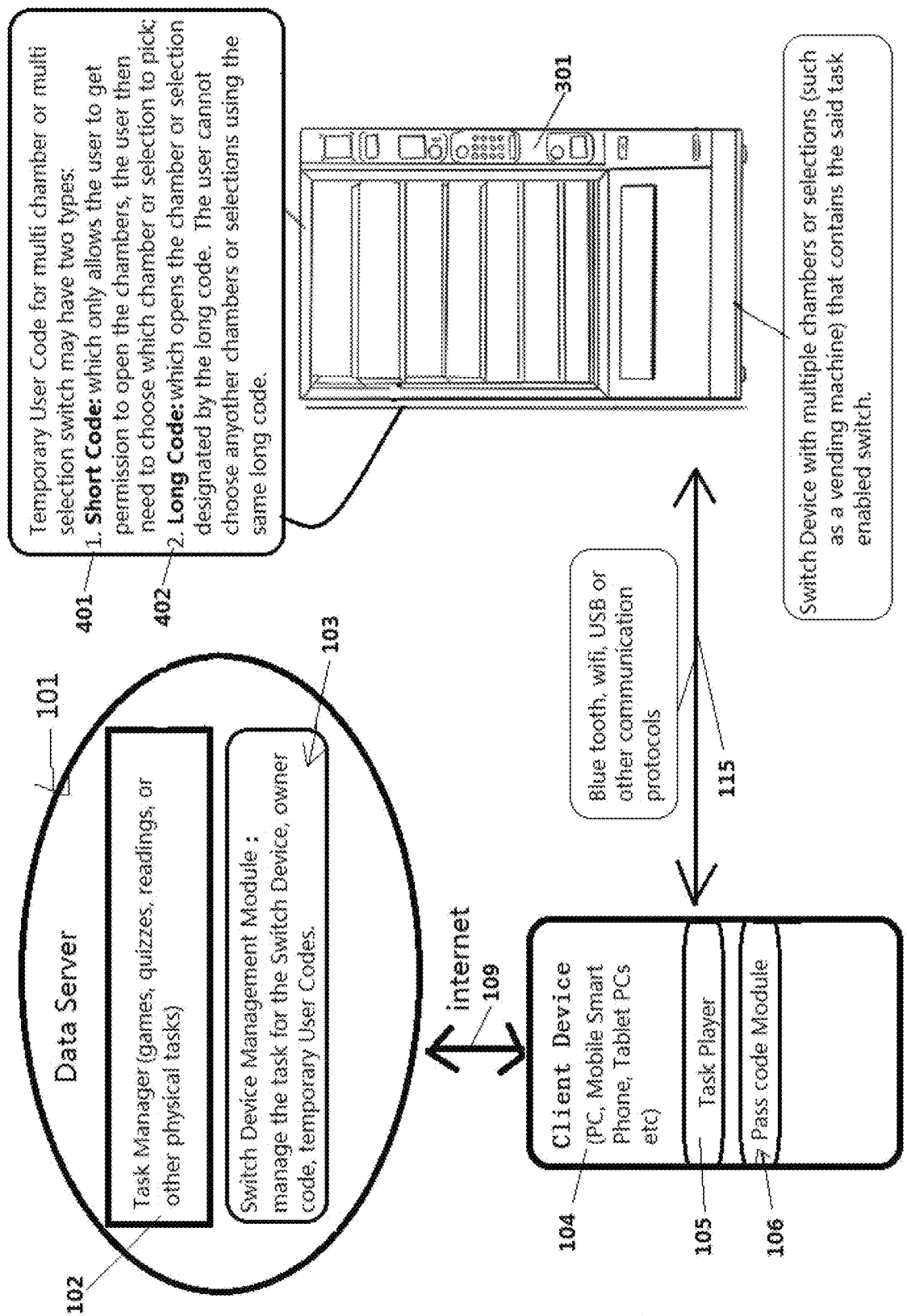
FIG. 4 shows that the Temporary User Codes for the Vending machine can be a Long Code which can only open the designated selection, or a Short Code which the user can choose selections after entering the Short Code.

Step 1004: Once the Switch Device 107 is opened using a Temporary User Code 109, the Temporary User Code 109 will be de-activated As Shown in FIG. 3. The Switch Device 107 can have multiple chambers or selections, such as a vending machine 301. The Temporary User Codes 109 for Switch Devices with multiple chambers or selections can have two types:
1. Short Code 401, which give the user access to the Switch Device, but does not limit which chamber or selection he should pick. The user can select any chamber or selection after entering the Short Code 401.
2. Long Code 402, which opens only the chamber or selection designated by the Long Code 402. The user cannot select any other chamber or selection.

Figure 5:
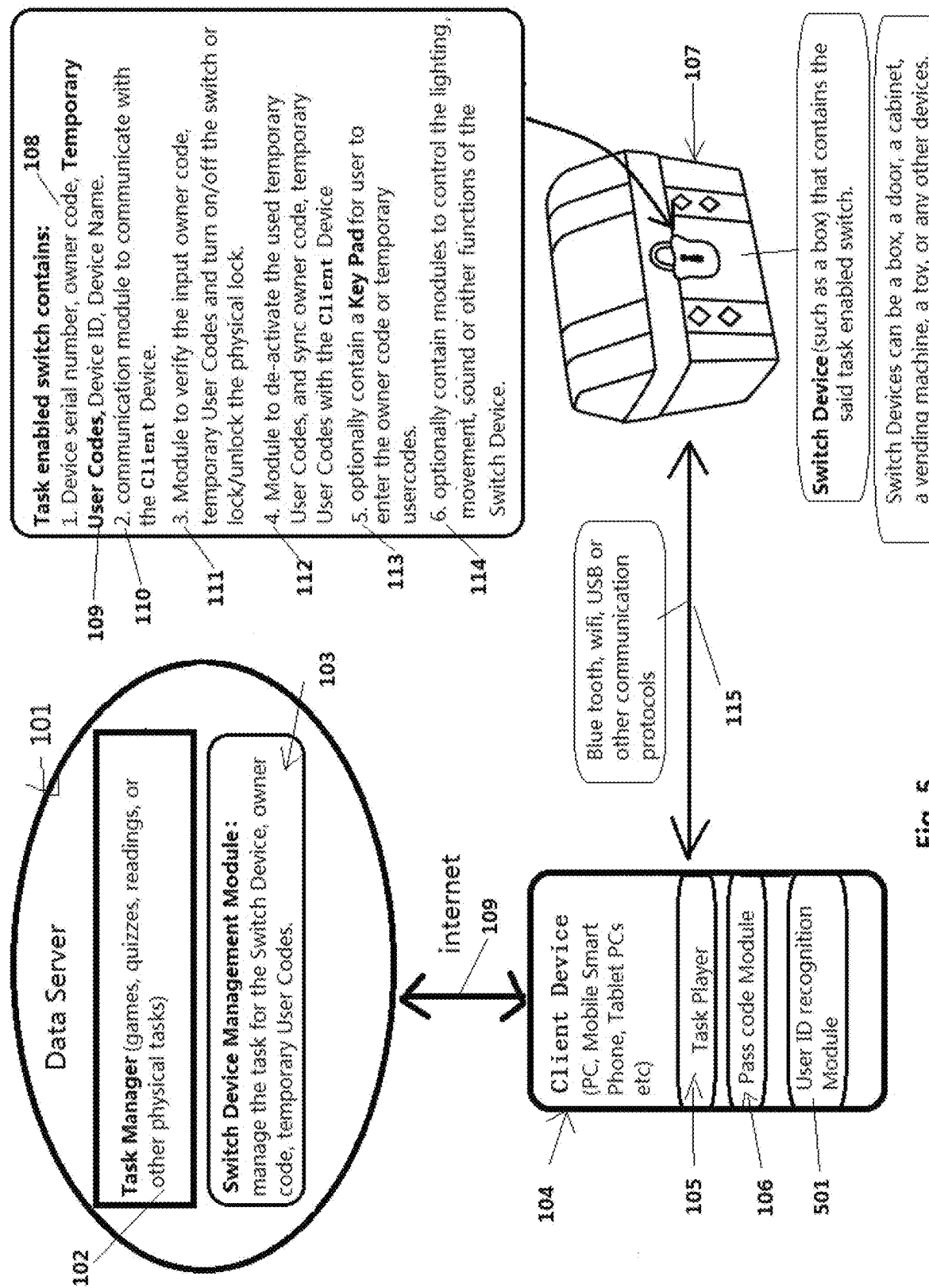
FIG. 5. shows that there can be a User ID recognition Module in the Client Device. The Task Manager in the Data Server can assign different tasks to different users even when all the users are trying to open the same Switch Device at the same time.

As shown in FIG. 5, there is a User ID Recognition Module 501 in the Client Device 104. It is used to identity the user and upload the info to the Data Server 101. The User ID Recognition Module 501 can identify the user by password, by facial or thumb image recognitions, or other ID recognition methods.

Figure 11:
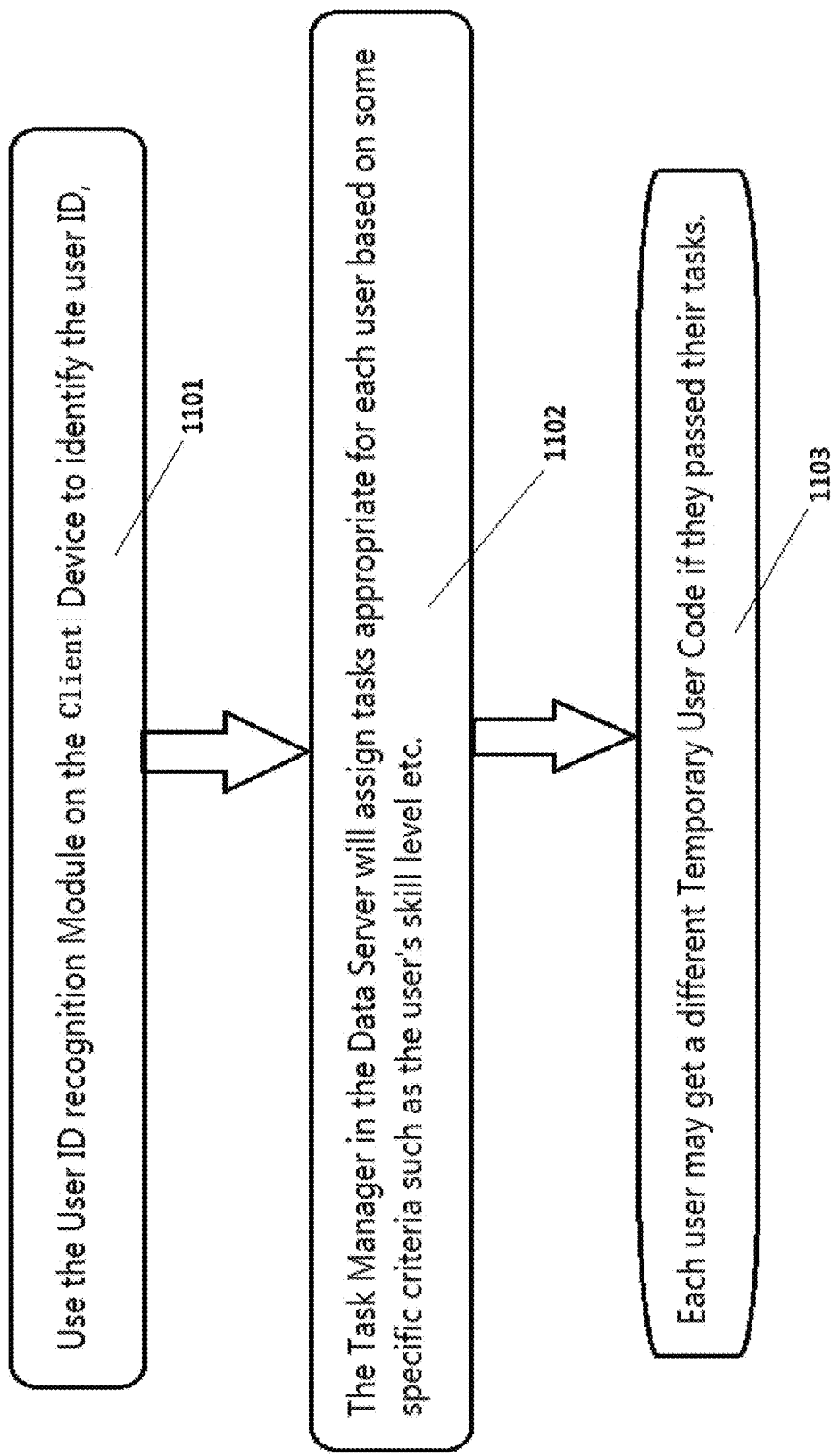
FIG. 11. is the flow chart for multiple users trying to open the same Switch Device at the same time.

As shown in FIG. 11. If there are multiple users trying to open the same Switch Device at the same time. The User ID Recognition Module 501 in the Client Device 104 can identify the user ID and send it to the Data Server 101 (step 1101). The Task Manager 102 and the Switch Device Management Module 103 can assign different tasks to different users according to some specific criteria such as the user's skill level etc (step 1102). After the users finished their tasks, each user may get a different Temporary User Code if they passed their tasks (step 1103).

Figure 6:
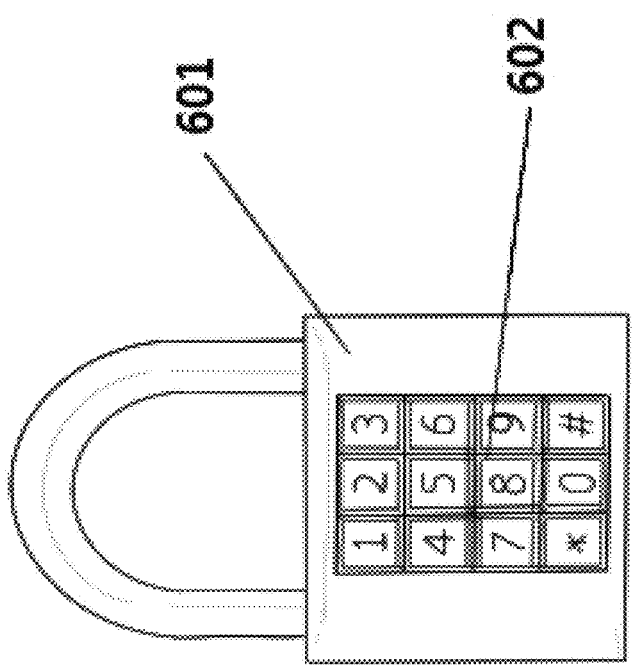
FIG. 6. Shows a pad lock designed with the said Task Enabled Switch and a keypad to enter the pass codes.

FIG. 6 shows a pad lock 601 that contains the said Task Enabled Switch 116. It also has a key pad 602, which is optional.

Figure 7:
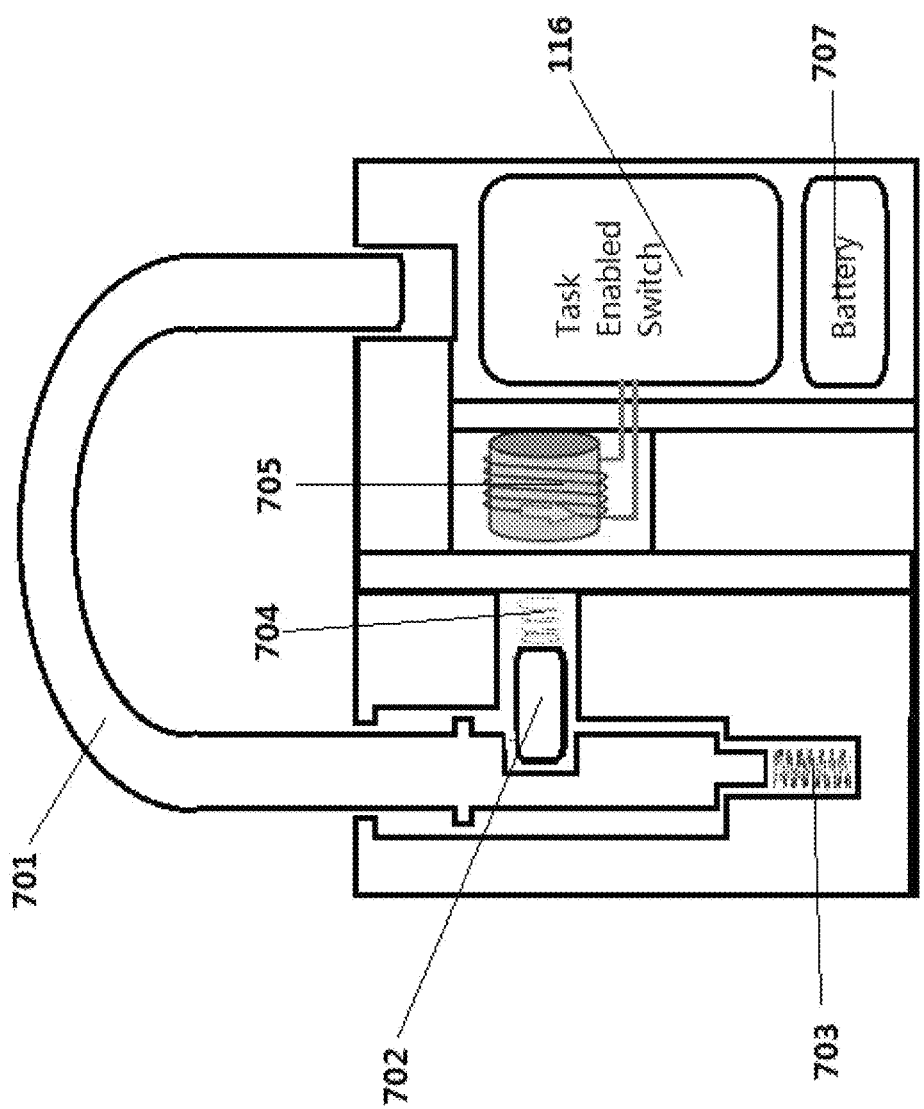
FIG. 7 shows one design of a pad lock with the said Task Enabled Switch.

FIG. 7 shows the diagram of one design of the pad lock 601. It consists of a dented metal bar 701, a metal bolt 702, two spring coils 703 and 704, a solenoid electric magnet 705, the Task Enabled Switch 116 and Battery 707. During the lock state, the bolt 702 locked the metal bar 701. To open the lock, the Task Enabled Switch 116 is turn on by the Client Device 104, which will activate the solenoid magnet 705. The solenoid magnet 705 will pull out the metal bolt 702, the metal bar 701 will then be ejected out by the spring coil 703. To lock the lock again, turn off the Task Enabled Switch, and push down the metal bar 701, the metal bolt 702 will again lock the metal bar 701 by the spring coil 704.

Figure 8:
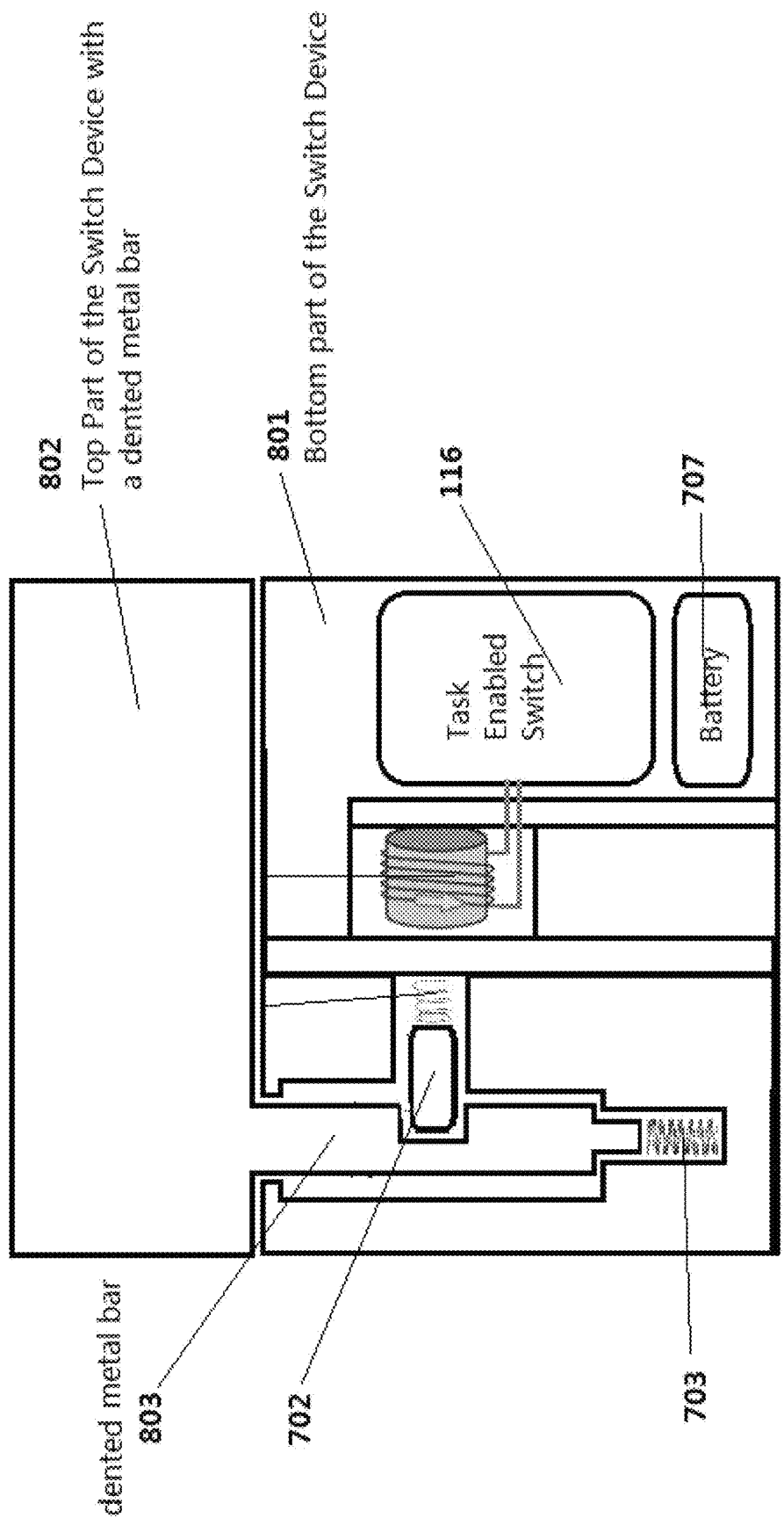
FIG. 8 shows one design of a lock with the said Task Enabled Switch.

FIG. 8 shows the diagram of lock used in a box with the said Task Enabled Switch. It is similar to the pad lock design of FIG. 7, except that the dented metal bar 803 is attached to the Top part of the box, and the rest of the lock is attached to the Bottom part of the box 801.

Figure 9:
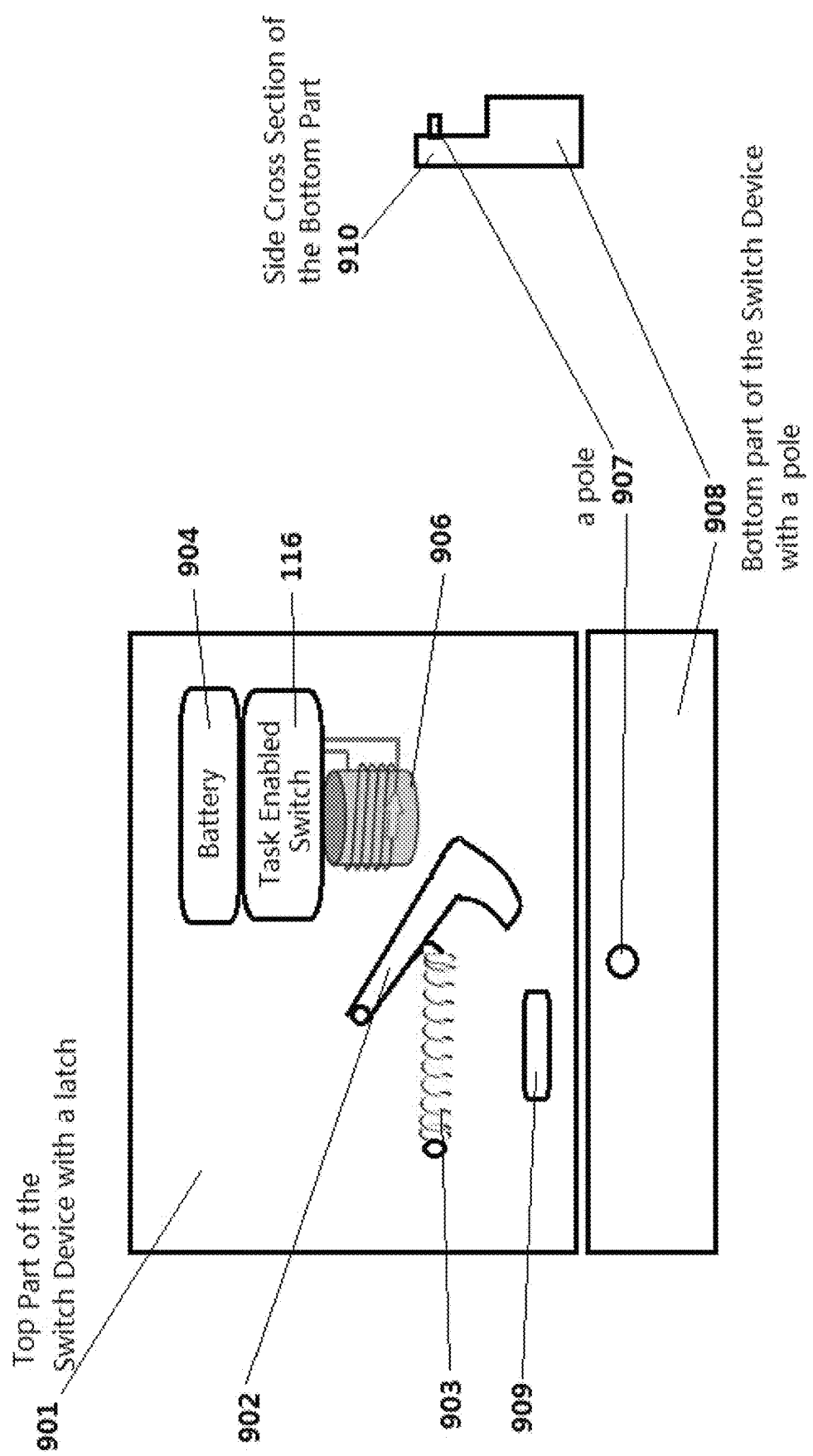
FIG. 9 shows one design of a latch with the said Task Enabled Switch.

FIG. 9 shows the diagram of one design of a latch with the said Task Enabled Switch. It may be used to lock a box. It consists of a Top part 901 and a Bottom part 908. The top part consists of a curved metal bar 902 which can rotate around one end; a spring coil 903 to pull the metal bar 902 into lock position; a Stop 909 to stop the metal bar 902 from swinging past lock position; The Task Enabled Switch 116; A solenoid electric magnet 906; and Battery 904.

On the bottom part 908, there is a pole 907 used to lock the latch. The Side Cross Section of the Bottom Part is also shown in 910.

To Lock the latch, turn off the solenoid magnet, the metal bar 902 will be pulled to the lock position. Then push the pole 907 past the lock position of metal bar 902, the pole 907 will be locked inside the metal bar 902.

To open the latch, the Client Device 104 will turn on the Task Enabled Switch 116, which will turn on the solenoid magnet 906, will then pull away the metal bar 902. The pole 907 can then be pulled out of the lock position.

It should be noted that the metal bar 902 can be pull open either by the solenoid magnet of 906, or by a small motor controlled by the Task Enabled Switch 116, the small motor can rotate the metal bar 902 to open or close the latch.

Figure 12:
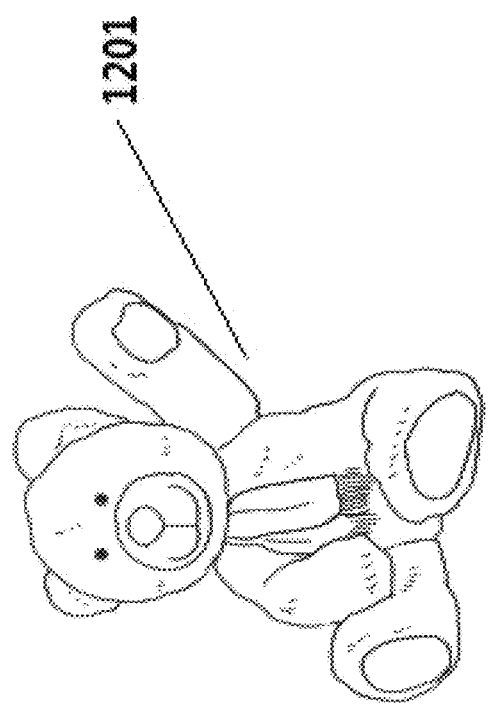
FIG. 12. shows that the Task Enabled Switch can be used to control the lighting, sound, movement or other functions of the Switch Device.
Figure 13:
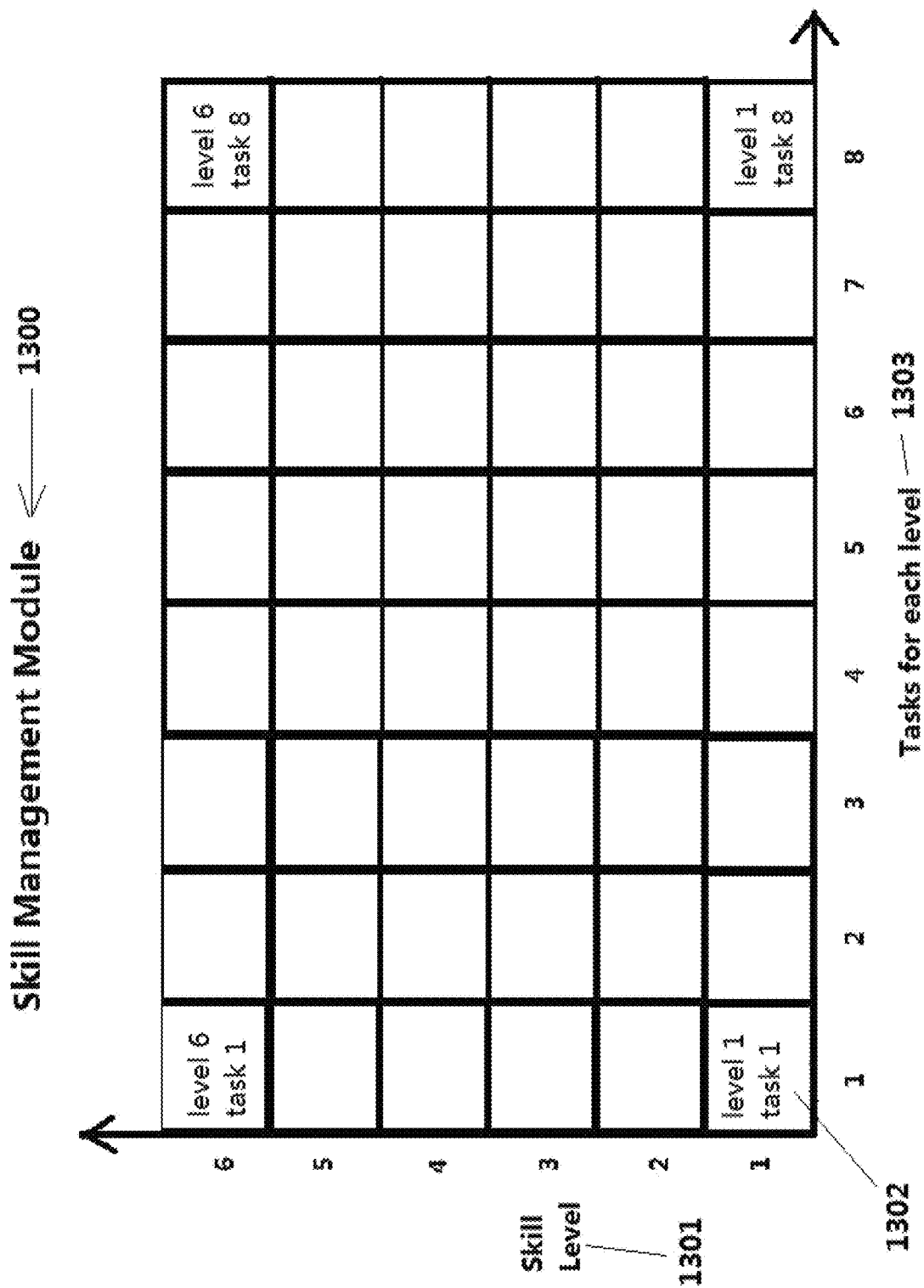
FIG. 13 shows an example of a skill in the skill management module that has several skill levels and several tasks for each level.

FIG. 12 shows that the said Task Enabled Switch 116 can be used to control the lighting, sound, movement, temperature, smell, size or other functions of the Switch Device.

In the Data Server 101, there is a Skill Management Module 1701 that contains a library of many different skills, each skill has different levels 1301, and each level has different tasks 1302. The levels 1301 can also be divided according to age, sex or other criteria. Each task also contains the reward points or electronic reward badges or electronic reward pictures once the task is completed.

The Skill Management Module 1701 also record the completion history and result for each task done by a user, so that the Skill Management Module 1701 can decide the current skill levels for a user, and it may automatically assign tasks according to a user's current skill levels when the user tries to open the lock.

The Skill Management Module 1701 also records the reward points, reward badges or reward pictures earned by each user after finishing a task.

To open the lock, the user can cither finish one or more assigned tasks, or he/she can open the lock using his/her reward points, or the badges he/she earned. The Switch Device Management Module 103 in the Data Server 101 may preset the points needed or badges needed to open the lock when the user upload his/her request to open the lock.

Furthermore, a user (such as a child) can receive reward points for good behavior, as well as tasks done. Once the reward points reached a preset level, the user can redeem the points to open the box with real rewards inside.

Furthermore, the tasks to open the lock can be downloaded from the backend Data server 101 as described previously, or they can be from other forms of electronic or non-electronic instructions given by a human person, such as parent or a teacher. E.g. The parent can just verbally ask the child to do a task, or ask the child to follow a good behavior. Once the parent found out that the task is done, or the child displayed a good behavior, she can give the child certain reward points.

The required points, or badges, or pictures needed to get access to open the switch device 107 can be set by the Data Server 101, or by a human judge such as a parent, or the owner, or the operator of the switch device 107.

Also, the tasks to open the switch device 107 can include Instant Messaging. Basically, there can be an Instant Messaging Module 1702 in the Data Server 101. The user who wants to open the switch device 107 can do a conversation with a judge (such as the owner or the operator of the Switch Device 107) through the Instant Messaging. If the judge is happy with the user's messaging response, the judge can grant the user the permission to open the box.

Figure 19:
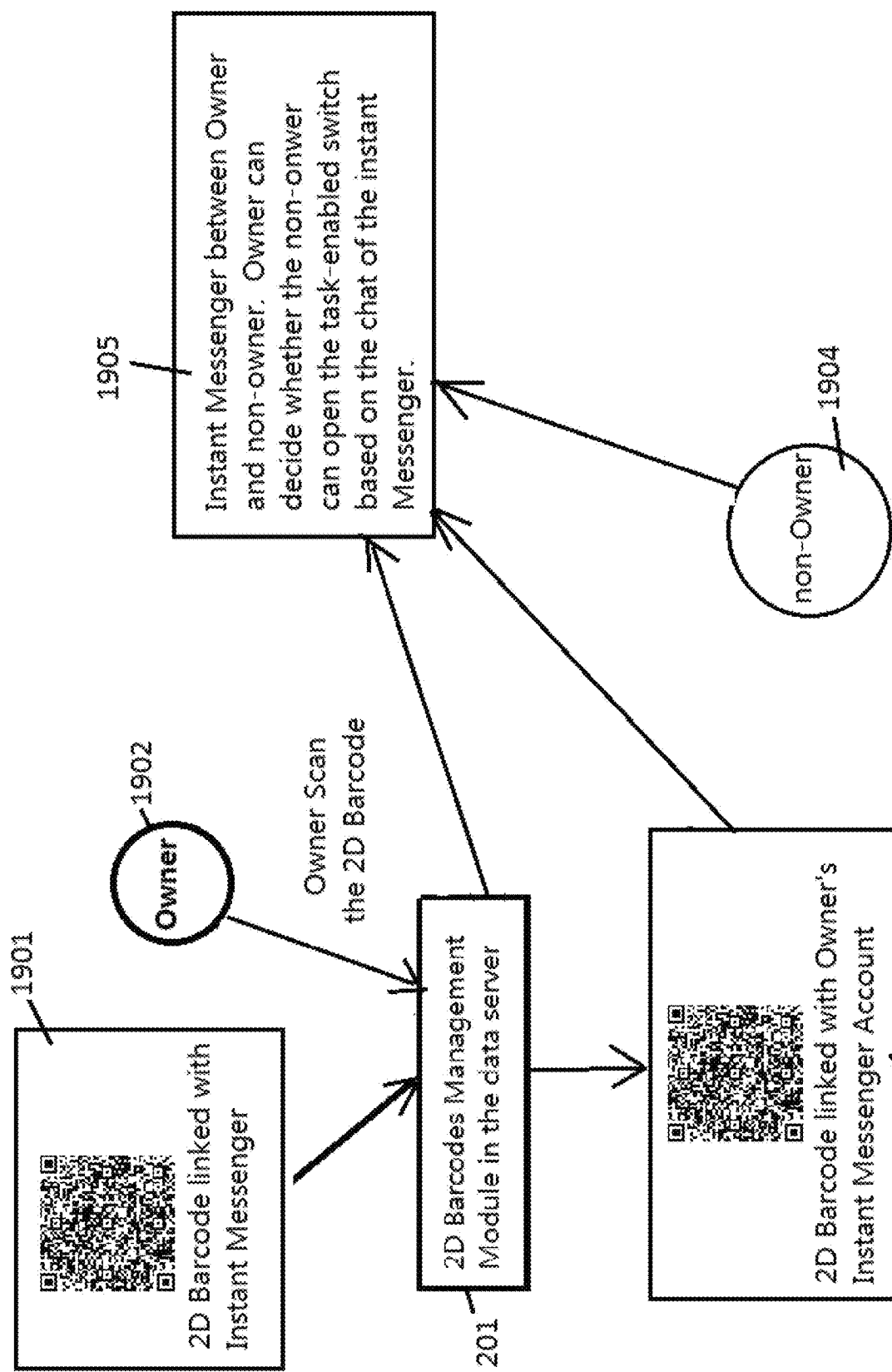
FIG. 19 shows one implementation of using Instant Messaging.

FIG. 19 shows one example of using a 2D QR code 1901, or other optical or RF tag to set up Instant Messenger. Once the judge or the Owner 1902 scan the 2D Barcode 1901, The 2D barcode 1901 will be automatically linked to the Owner 1902's Instant Messenger Account. Once a user 1904 scans the 2D Barcode 1903, he or she will be directed to an Instant Messenger page with the owner 1902.

Figure 14:
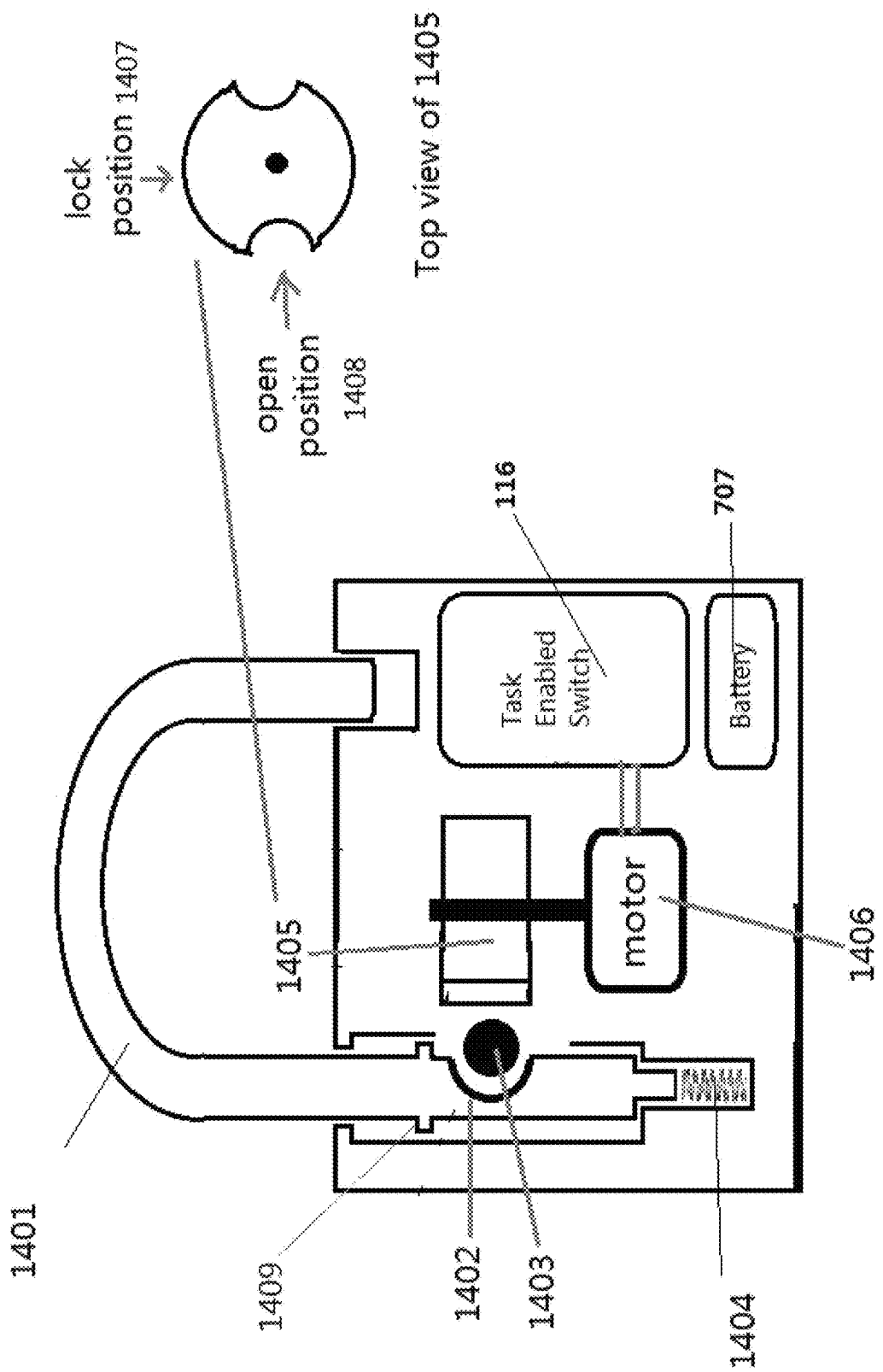
FIG. 14 shows another example of a pad lock design.

FIG. 14 is another example of a pad lock design. Besides the Task Enabled Switch 116, it has a circular dent 1402 in its shackle 1401, a small ball 1403 that fits the dent 1402. There is a rotating piece 1405 which also has dents that can fit the small ball 1403. When the rotating piece 1405 rotates to the lock position 1407, it pushes the small ball 1403 into the dent 1402, which will lock the lock; When the rotating piece 1405 rotates to the open position 1408, the small ball 1403 will move out of the dent 1402, and the spring 1404 will push the shackle 1401 out. The motor 1406 is controlled by the Task Enabled Switch 116.

To prevent the shackle 1401 from being totally pushed out of the lock when unlocking the lock, a stop 1409 is attached to the shackle 1401.

Figure 18:
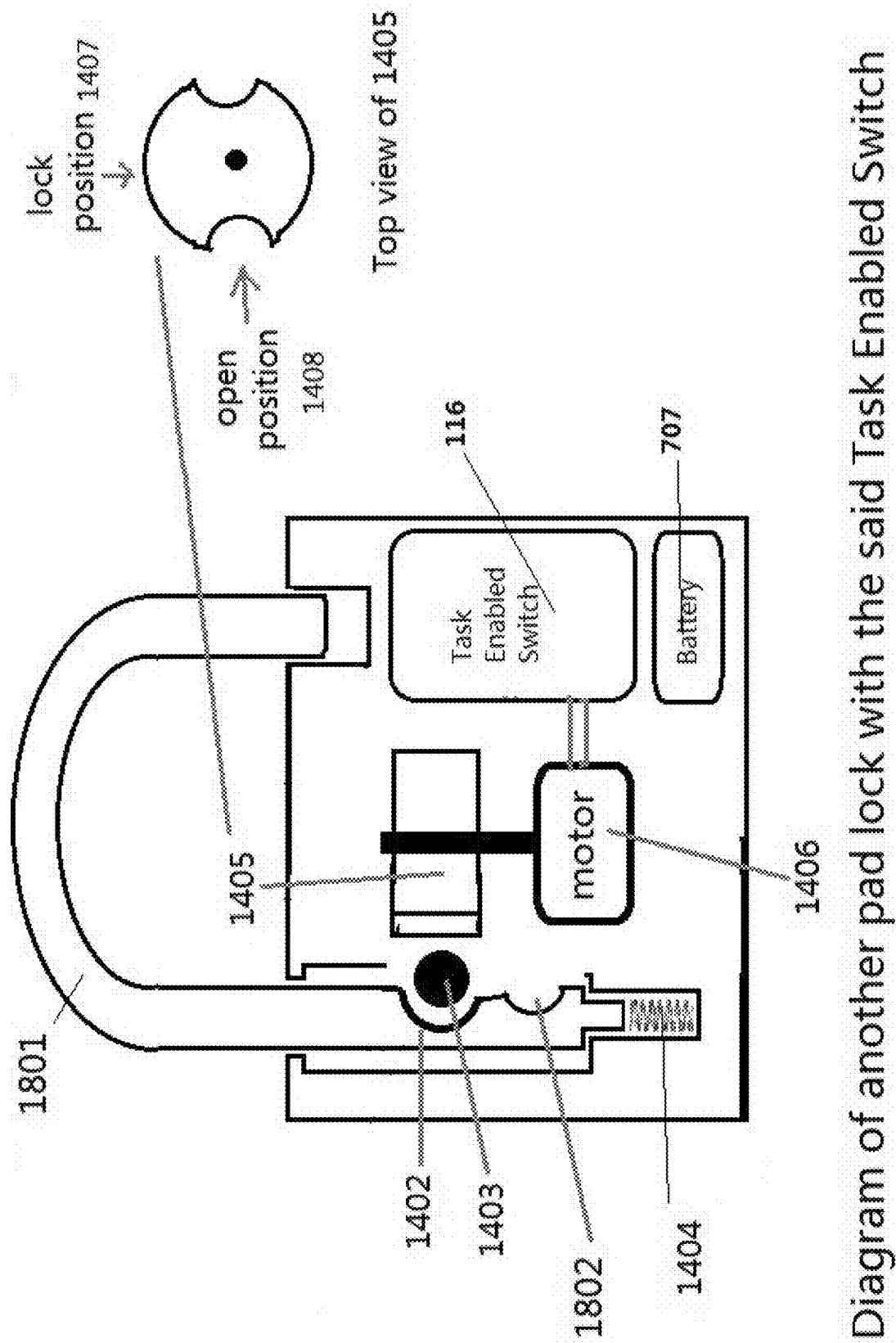
FIG. 18 shows another design of a pad lock.

Another method to prevent the shackle from being totally pushed out of the lock when unlocking the lock is shown in FIG. 18, where in the shackle 1801 has two dents: a top deep dent 1402, and a lower shallow dent 1802. During unlocking, the shackle 1801 is pushed up, so the ball 1403 rolls from the deep dent 1402 into the shallow dent 1802. The shallow dent 1802 will stop the shackle 1801 from being totally pushed out.

Figure 15:
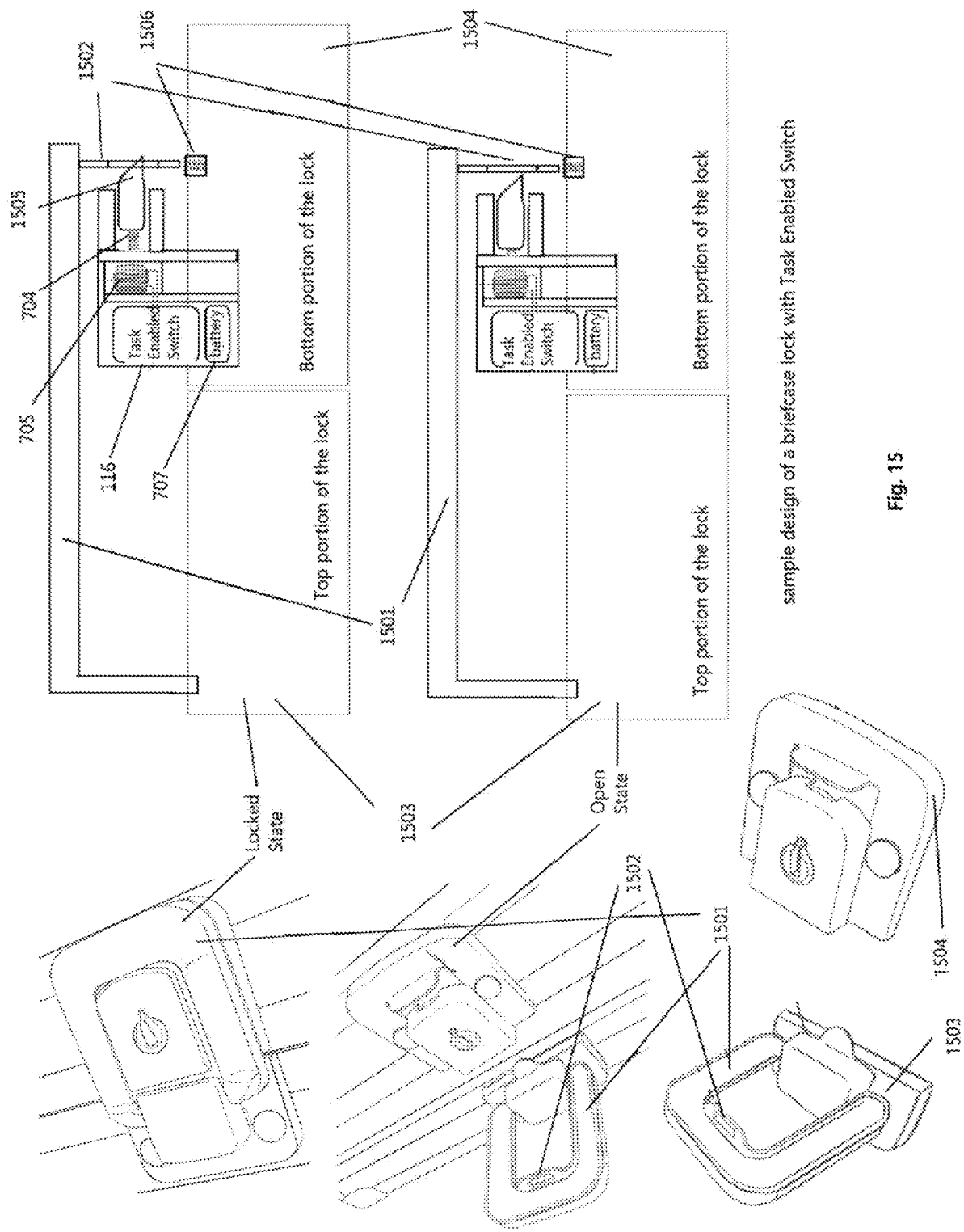
FIG. 15 shows an example of a briefcase lock design.

FIG. 15 is art example of a briefcase lock powered by the said Task Enabled Switch. It has a Top Portion 1503 and a Bottom portion 1504, a frame 1501 with a hole 1502. If the Task Enabled Switch 116 is off, then the spring 704 will push the metal bolt 1505 into the hole 1502, thus the lock is locked. If the Task Enabled Switch 116 is on, then the magnet 705 will pull the metal bolt 1505 out of the hole 1502, thus the lock is opened.

To save the battery power, the Task Enabled Switch 116 will only be on for a very short time, thus a spring 1506 is placed beneath the frame hole 1502. The spring 1506 will push the frame 1501 up when the bolt 1505 is pulled out of the hole 1502. Thus after the short on time is over, the bolt 1505 won't be pushed back into the hole 1502 to automatically lock the lock again.

To lock the lock, we can also turn on the Task Enabled Switch 116 to pull the bolt 1505 out of the hole 1502, then press down the frame 1501. Then power off the Task Enabled Switch 116 so that the bolt 1505 will be pushed into the hole 1502 to lock the lock. We can detect the position of the frame 1501 to automatically turn on the Switch 116 for a short period of time when the frame 1501 is lowered below some position. Once the frame 1501 is fully lowered, the switch 116 will be off, so the Bolt 1505 will be inserted into the hole 1502 to lock the lock.

Another way to lock the lock is to make the tip of the bolt 1505 a wedge shape just as shown in FIG. 15. In this way, we do not need to turn on the switch 116 when locking the lock. All we need to do is to press down the frame 1501, the edge of the hole 1502 will be sliding on the wedge tip of the bolt 1505 until the bolt 1505 slides into the hole 1502 to lock the lock.

Figure 16:
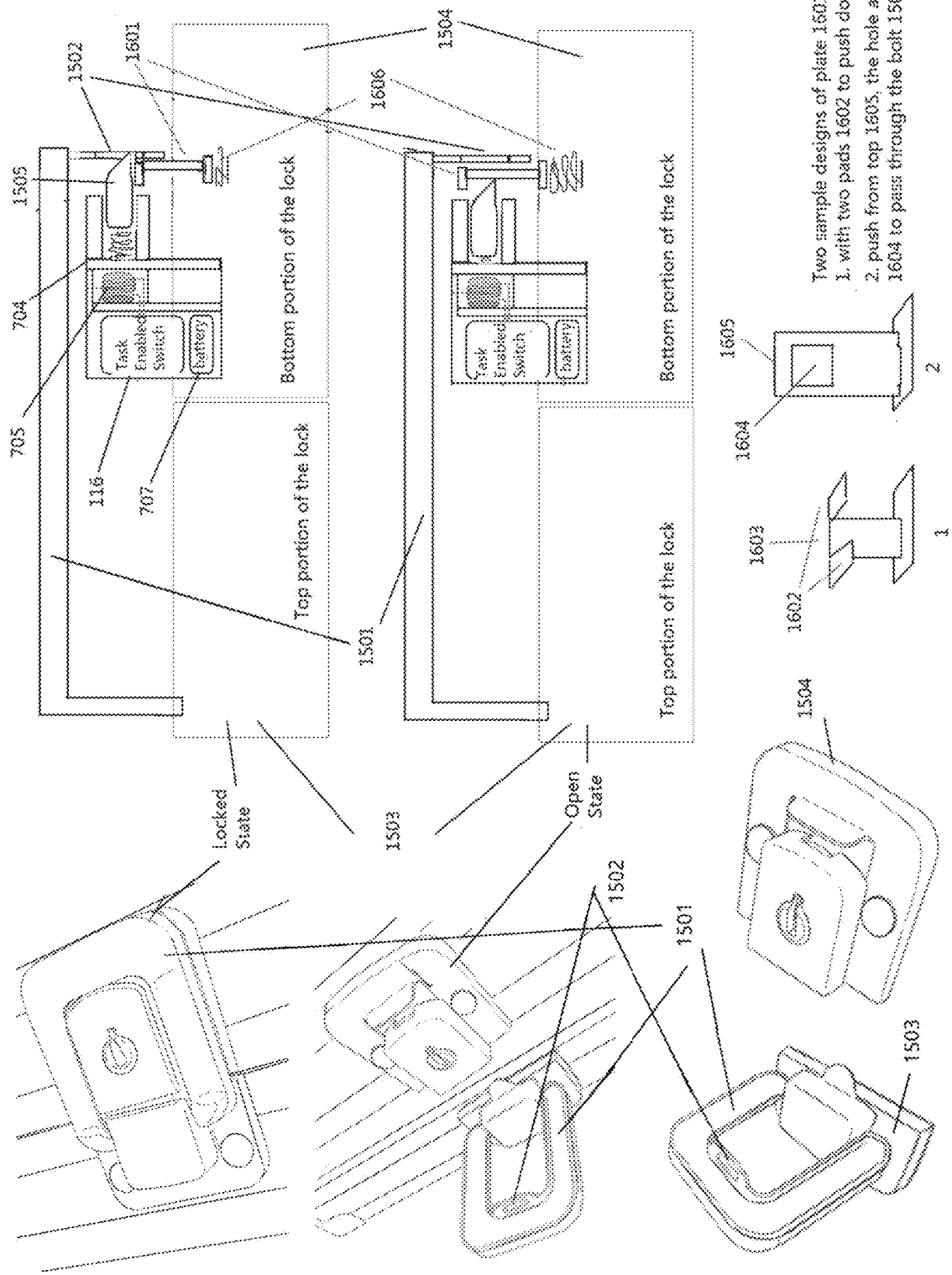
FIG. 16 shows another example of a briefcase lock design.
Figure 17:
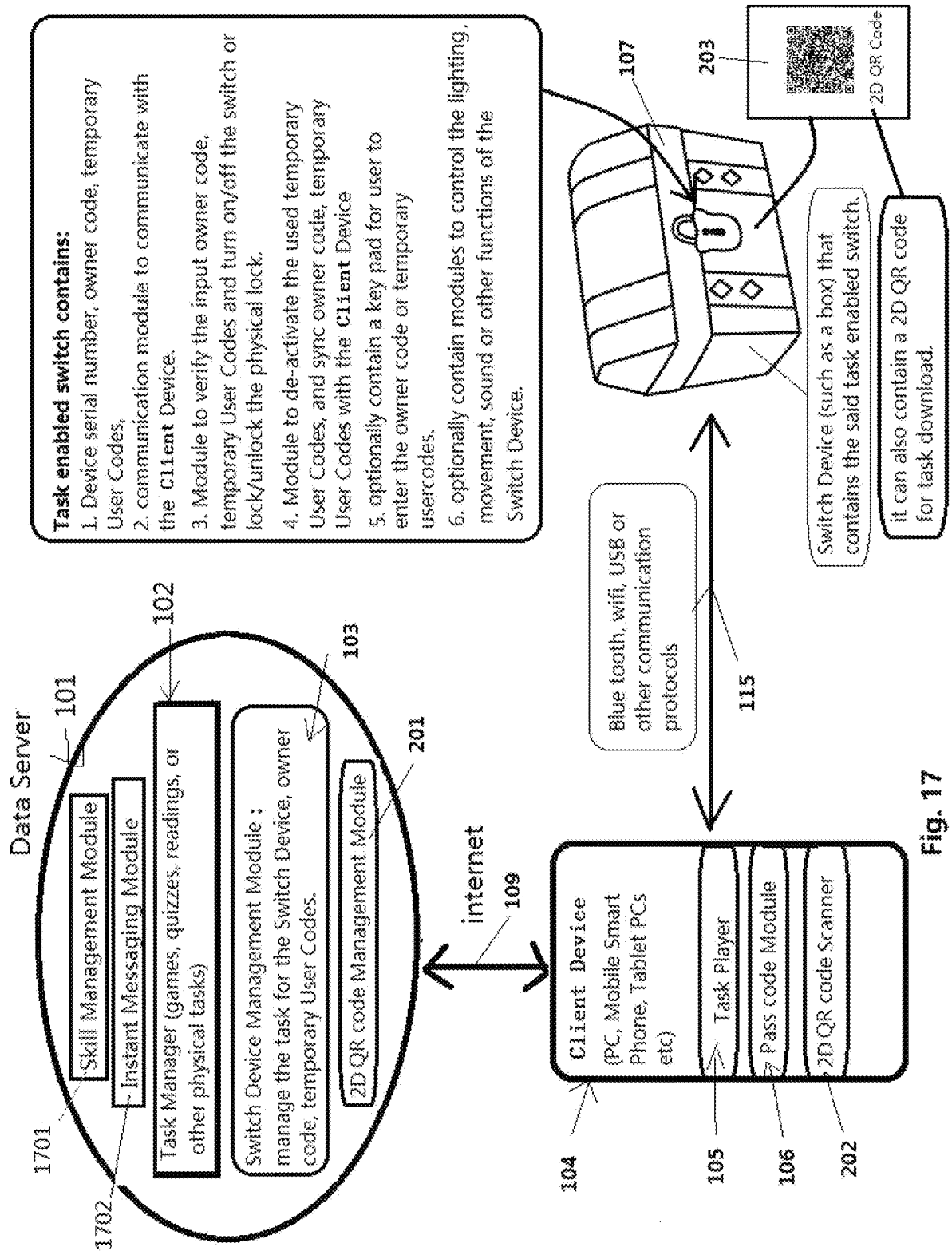
FIG. 17 shows the Skill Management Module and Instant Messaging Module in the Data Server.

FIG. 16 is another example of a briefcase lock using the said Task Enabled Switch 116. What's different from FIG. 15 is the design on how to prevent the bolt 1505 from locking the lock again once the short turn-on time of switch 116 is ended. In the FIG. 16 design, when the lock is opened and the bolt 1505 is pulled out of the hole 1502, a plate 1601 will be pushed up automatically by a spring 1606 to block the bolt 1505 from entering the hole 1502. FIG. 16 shows two sample designs for the plate 1601. In the first design, side plates 1602 can be used to push down the plate. In the second design, there is a hole 1604 that can let bolt 1505 pass through. To lock the lock again, the user needs to press down the plate 1601 so that the edge 1603 or the bottom of the hole 1604 is below the bolt 1505 so that the bolt 1505 is no longer blocked from entering the hole 1502 to lock the lock.

FIG. 20 shows a game system that consists of a set of game pieces 2007, each game piece 2007 has a dynamic QR code, or other optical or Radio Frequency tag 2008. Each player can pick any game piece 2007, and scan the QR code or the Optical or RF tag 2008, or simply take a picture of the game piece 2007, the player will receive one or more tasks according to his/her current skill levels. Once the player finishes the tasks, he will receive reward points, reward badges or reward pictures for these tasks. The first player or a team of players who earned the pre-set reward points or the required set of reward badges or reward pictures will be the winner. Of course, a reward box with the Task Enabled Switch 116 can be incorporated in the system, so that the winner can open the box after winning and retrieve the real reward.

It should be pointed out that the proposed game pieces 2007 can be as small as ordinary chess pieces to be played at home (we can make the game pieces in any forms and shapes), or as large as the roller coasters in an amusement park, or the exhibits in a zoo. And there can be some variations in the actual implementations. In the settings of an amusement park, we can set each roller coaster ride as a task. In this case, the user can skip the step of scanning a QR code 2008 to retrieve tasks. Rather, he can just pick a rollercoaster and take the ride. After the user finishes riding that rollercoaster, he can scan a QR code at the exit, which will automatically notify the Data Server 101 that the user finished riding that rollercoaster. In the setting of a Zoo, each exhibit can have a poster with a QR code, when a user scans the QR code, it can either notify the Data Server 101 that the user visited that exhibit, or it can retrieve some electronic learning games or quizzes related to the exhibit for the user to answer. The winning criteria can be set to be either the number of exhibits visited during a certain time period, or the number of quizzes completed during a certain time period, or the reward points received by visiting the exhibits and completion of the quizzes.

The game system based on the said invention comprises the following steps:

2001. A user joins the game system;
2002. The Skill Management Module 1701 assigns the skills and skill level for each player;
2003. Each player scans the 2D barcode on selected game pieces using the Client Device 104, the Client Device 104 uploads the user identifiers and the 2D barcode identifier to the Data Server 101;
2004. The Client Device 104 receives one or more tasks from the Skill Management Module 1701, the one or more tasks are based on the user identifier, 2D barcode identifier, and the skill level.
2005. Once a player finishes the one or more tasks, the Client Device 104 will upload the results to the one or more Data Server devices 101, and the Data Server 101 will decide how many points or what rewards badges or reward pictures the player should receive based on the results of the completion of the tasks.
2006. Once the points earned by a player or the total points earned by a team of players reached the designated value, or the reward badges or reward pictures collected by one player or a team of players reached the designated set, the game ends.

In the above step 2002, the skill management module 1701 assigns the skill and the skill level according to:
1. Each player selects his/her own skill and the skill level for the game;
2. The Skill Management Module 1701 stores the tasks completion history of the players, and assigns skills and skill level automatically according to each player's skill level.

The one or more tasks in step 2004 comprise automatically graded tasks and manually graded tasks;
  wherein said automatically graded tasks comprise electronic learning games, electronic quizzes, electronic books,
  wherein said manually graded tasks comprise instructions to do one or more tasks to be judged by one or more human judges or other human players. Examples of manually graded tasks include performance, acting, singing, or other physical activities
  determining at the Client Device 104 and/or the Data Server 101, in the case of an automatically graded task, the results of automatically graded tasks;
  notifying the Data Server 101 the results of a manually graded task by a designated human judge or a human game player;

In step 2001, a user can join the game system by one of the following:
2201. A player searches the game system ID on the Client Device,
2202. A player enters the game system ID on the Client Device
2203. A player receives a weblink for the game system, click on the link
2204. A player scans a 2 dimensional barcode or any optical or RF tag linked with the game system.

In the step 2005 of the game system, A player can scan a 2D barcode linked with a task, and notify the server that the task is done. E.g. The game can be applied in an amusement park, where the tasks can be riding different levels of roller coasters. We can put the 2D barcodes linked with each roller coaster at the exit of each rollercoaster. Once a player finished riding the rollercoaster, he/she can scan the 2D barcode at the exit, which will automatically notify the Data Server 101 that the player just finished the task of riding this roller coaster.

The said game system can be used in conjunction with ordinary board games or playing cards:
2301. After a player scans the 2D barcode or other machine readable optical or RF tag on a game piece, or simply take a picture of the game piece, the Data Server 101 will download one or more tasks based on the player's skill level. Once the player finishes the tasks, the Client Device will upload the task completion results to the server devices and receive instructions on what the player should move on the board game or the playing cards.
2302. A player can also scan the 2D barcode on a game piece, and automatically receive from the server devices the instructions on what the player should move on the board game or the playing card Finally, it should be pointed out that we can always make simpler versions of the said invention using only the client device 104 and the switching device 107. That is, the Data Server 101 is not necessary for simpler versions. E.g. We can install a simpler version of the skill management module 1701, Task Manager 102, Switch Device Management Module 103 in the client device 104. We can also install a simpler version of the 2D QR code management module 201, or the Instant Messaging Module 1702 in the client device 104. In these implementations, the client device 104 can be regarded its being merged with the Data Server 101.

One of the simplest but useful implementation would be in parenting or classroom management, where a parent or a teacher can ask a child or a student to do some tasks or follow some rules or good behaviors. After the child or the student finished the tasks or followed the rules or good behaviors, the parent or the teacher can give the student some bonus points. Once the child or the student earned enough points, he can redeem the points to get access to open the switch device 107. In this simple implementation, the client device 104 is definitely enough.

Figure 21:
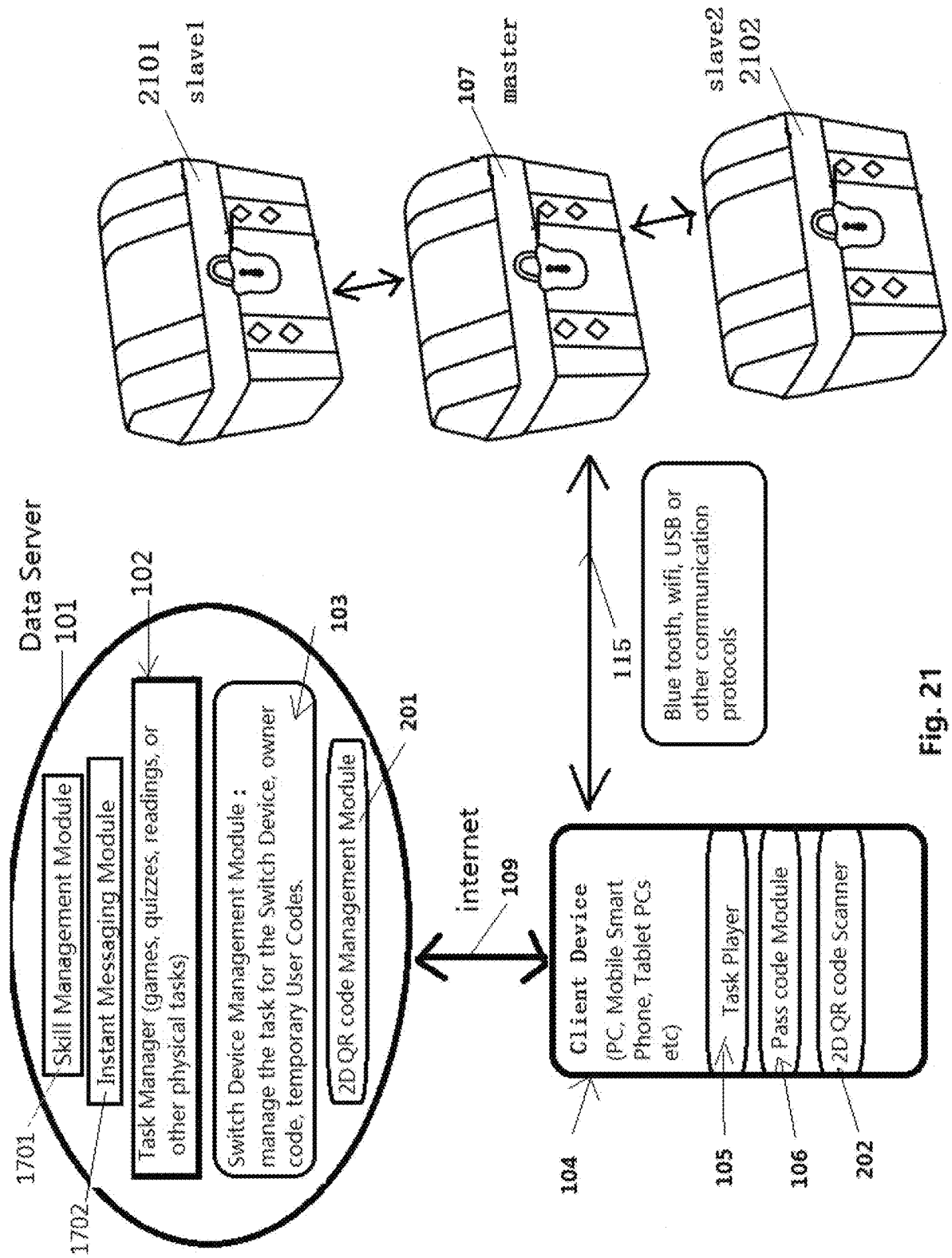
FIG. 21 shows the master and slave set up of several locked devices.

FIG. 21 shows the setup if several locked devices are needed. The simplest way is to treat each locked device as equal and independent, they all communicate directly with the client device 104. Yet another method to save some cost of the Task Enabled Switches 116 inside the locked devices 107, 2101 and 2102, is to set up the locked devices 107, 2101 and 2102 as Master and Slave configurations, in which the Master Device 107 communicates directly with the client device 104; while other Slave Devices 2301 and 2302 communicate only with the master device 107. The connections between the slave 2101 and the master 107 can be as simple as the master 107 sends the turn on signal to the slave 2101; or the connections between the slave 2101 and the master 107 can be a little more complicated such that they include some ID security verifications of the slave devices 2101 and 2102 depending on the application needs.

The invention claimed is:

1. A computer-implemented method comprising:
  receiving, by a client device, an identifier associated with a locked device;
  based on the identifier, transmitting, by the client device to one or more server devices, a request to unlock the locked device;
  transmitting, from the client device to the one or more server devices, a user identifier associated with a user of the client device;
  receiving at the client device, in response to the request to unlock the locking mechanism, one or more tasks associated with the locked device, wherein the one or more tasks are selected from a plurality of tasks based on the user identifier, comprising automatically graded tasks and/or manually graded tasks;

automatically determining at the client device and/or at the one or more server devices that all or a required percentage of the automatically graded tasks have been completed and passed, wherein said automatically graded tasks comprise electronic games, electronic quizzes, and electronic books;

manually determining at the client device that all or a required percentage of the manually graded tasks have been completed and passed, wherein said manually graded tasks comprise instructions to complete one or more tasks to be judged by one or more designated human judges, notifying the one or more server devices from the client device that said one or more designated human judges have determined that all or a required percentage of the manually graded tasks received by the client device have been completed and passed, notifying the one or more server devices from the client device that all or a required percentage of the automatically graded tasks have been completed and passed, receiving, by the user, reward points, reward badges or reward pictures based on the tasks completed and passed, redeeming, by the user, reward points, reward badges or reward pictures to get permission to open the locked device, and unlocking the locked device.

2. The method of claim 1, wherein the step of unlocking the device comprises one of the client device or the one or more server devices sending a signal directly to the locked device to unlock the locked device.

3. The method of claim 2, wherein the signal is transmitted through a wired connection, or a wireless connection.

4. The method of claim 1, wherein the step of unlocking the device comprises:
the client device receiving an authorization code from the one or more server devices,
the user entering the authorization code to an interface of the client device, and
the client device transmitting the authorization code to an interface of the locked device.

5. The method of claim 4, wherein the authorization code is a temporary code.

6. The method of claim 4, wherein authorization code unlocks one or more physical locking mechanisms of a plurality of locking mechanisms coupled to a physical container, each locking mechanism providing access to a portion of the container.

7. The method of claim 1, wherein the step of unlocking the device comprises:
the client device receiving an authorization code from the one or more server devices, and
the user entering the authorization code to an interface of the locked device.

8. The method of claim 7, wherein the authorization code is a temporary code.

9. The method of claim 7, wherein authorization code unlocks one or more physical locking mechanisms of a plurality of locking mechanisms coupled to a physical container, each locking mechanism providing access to a portion of the container.

10. The method of claim 1, wherein the identifier is received from scanning of a two-dimensional barcode, or an optical tag or a RF tag on the locked device, or from taking a picture of the locked device.

11. The method of claim 1, wherein the locked device comprises a physical container locked with a locking mechanism.

12. The method of claim 11, wherein said locking mechanism comprises:
a movable member controllable by electromagnetic means,
means to energize the electromagnetic means to cause an electromagnetic field,
a member including at least one indentation,
wherein the movable member is movable towards said member including at least one indentation into said at least one indentation to lock the lock, and
wherein the movable member is movable away from said member including at least one indentation to unlock the lock.

13. The method of claim 11, wherein said locking mechanism comprises:
a movable member having at least one curvature, the movable member controllable by electromagnetic means,
means to energize the electromagnetic means to cause an electromagnetic field,
a fixed member,
wherein the movable member is movable towards the fixed member to enclose the fixed member to lock the locking device, and
wherein the movable member is movable away from the fixed member to uncover the fixed member to unlock the locking device.

14. The method of claim 11, wherein said locking mechanism comprises:
a movable member having at least one curvature, the movable member controllable by an electric motor,
a fixed member,
wherein the movable member is movable towards the fixed member to enclose the fixed member to lock the locking device, and
wherein the movable member is movable away from the fixed member to uncover the fixed member to unlock the locking device.

15. The method of claim 1, wherein the locked device comprises an electronic device, and wherein unlocking the locked device comprises providing access to one or more functionalities of the electronic device.

16. The method of claim 15, wherein the one or more functionalities comprises a lighting, sound, smell, temperature, size or movement of the electronic device.

17. The method of claim 1, wherein said one or more tasks are selected automatically based on current skill levels of the user, wherein the current skill levels are determined by a prior task completion history of the user.

18. The method of claim 1, wherein said one or more tasks are downloaded from the one or more server devices, or from other forms of electronic or non-electronic instructions given by a human person.

19. The method of claim 1, wherein said notifying the one or more server devices from the client device that said one or more designated human judges have determined that all or a required percentage of the manually graded tasks received by the client device have been completed and passed comprises scanning a 2D barcode, or an optical tag, or a RF tag.

20. The method of claim 1, wherein said one or more tasks comprise an instant messaging between the user and a judge, wherein the judge can decide whether to grant the user the permission to open the locked device based on an instant messaging response from the user.

21. The method of claim 1, wherein said client device and one of the server devices comprise a single physical device.

22. The method of claim 1, wherein said locked device is a combination of several devices, comprising:
- a master device communicating directly with one or more client devices or the one or more server devices;
- one or more slave devices that communicate and receive turn on signals from the master device.

23. A system comprising:
a memory;
at least one processor coupled, to the memory and configured to:
- receive, by a client device, an identifier associated with a locked device;
- based on the identifier, transmit, by the client device to one or more server devices, a request to unlock the locked device;
- transmit, from the client device to the one or more server devices, a user identifier associated with a user of the client device,
- receive at the client device, in response to the request to unlock the locking mechanism, one or more tasks associated with the locked device, wherein the one or more tasks are selected from a plurality of tasks based on the user identifier, comprising automatically graded tasks and/or manually graded tasks;
- automatically determine at the client device and/or at the one or more server devices that all or a required percentage of the automatically graded tasks have been completed and passed, wherein said automatically graded tasks comprise electronic games, electronic quizzes, and electronic books;
- manually determine at the client device that all or a required percentage of the manually graded tasks have been completed and passed, wherein said manually graded tasks comprise instructions to complete one or more tasks to be judged by one or more designated human judges,
- notify the one or more server devices from the client device that said one or more designated human judges have determined that all or a required percentage of the manually graded tasks received by the client device have been completed and passed,
- notify the one or more server devices from the client device that all or a required percentage of the automatically graded tasks have been completed and passed, and
- receive, by the user, reward points, reward badges or reward pictures based on the tasks completed and passed,
- redeem, by the user, reward points, reward badges or reward pictures to get permission to open the locked device; and
- unlock the locked device.

24. The system of claim 23, wherein the step of unlocking the device comprises one of the client device or the one or more server devices sending a signal directly to the locked device to unlock the locked device.

25. The system of claim 23, wherein the step of unlocking the device comprises:
- the client device receiving an authorization code from the one or more server devices,
- the user entering the authorization code to an interface of the client device, and
- the client device transmitting the authorization code to an interface of the locked device.

26. The system of claim 25, wherein the authorization code is a temporary code.

27. The system of claim 25, wherein authorization code unlocks one or more physical locking mechanisms of a plurality of locking mechanisms coupled to a physical container, each locking mechanism providing access to a portion of the container.

28. The system of claim 23, wherein the step of unlocking the device comprises:
- the client device receiving an authorization code from the one or more server devices,
- the user entering the authorization code to an interface of the locked device.

29. The system of claim 23, wherein the identifier is received from scanning of a two-dimensional barcode, or an optical tag or a RF tag on the locked device, or from taking a picture of the locked device.

30. The system of claim 23, wherein the locked device comprises an electronic device, and wherein unlocking the locked device comprises providing access to one or more functionalities of the electronic device.

31. The system of claim 30, wherein the one or more functionalities comprises a lighting, sound, smell, temperature, size or movement of the electronic device.

32. The system of claim 23, wherein said one or more tasks are selected automatically based on current skill levels of the user, wherein the current skill levels are determined by a prior task completion history of the user.

33. The system of claim 23, wherein said one or more tasks are downloaded from the one or more server devices, or from other forms of electronic or non-electronic instructions given by a human person.

34. The system of claim 23, wherein notifying the one or more server devices from the client device that said one or more designated human judges have determined that all or a required percentage of the manually graded tasks received by the client device have been completed and passed comprises scanning a 2D barcode, or an optical tag, or a RF tag.

35. The system of claim 23, wherein said one or more tasks comprises an instant messaging between the user and a judge, wherein the judge can decide whether to grant the user the permission to open the locked device based on an instant messaging response of the user.

36. The system of claim 23, wherein said client device and one of the server devices comprise a single physical device.

37. The system of claim 23, wherein said locked device is a combination of several devices, comprising:
- a master device communicating directly with one or more client devices or the one or more server devices;
- one or more slave devices that communicate and receive turn on signals from the master device.

* * * * *